US012449931B2

(12) United States Patent
Lee et al.

(10) Patent No.: US 12,449,931 B2
(45) Date of Patent: Oct. 21, 2025

(54) DISPLAY DEVICE

(71) Applicant: SAMSUNG DISPLAY CO., LTD., Yongin-si (KR)

(72) Inventors: Seungchan Lee, Yongin-si (KR); Seongjun Lee, Yongin-si (KR); Sanghyun Jun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/483,761

(22) Filed: Oct. 10, 2023

(65) Prior Publication Data
US 2024/0256077 A1   Aug. 1, 2024

(30) Foreign Application Priority Data

Jan. 27, 2023   (KR) .................. 10-2023-0011037

(51) Int. Cl.
*G06F 3/041* (2006.01)
(52) U.S. Cl.
CPC ...... *G06F 3/04164* (2019.05); *G06F 3/04182* (2019.05); *G06F 2203/04107* (2013.01)
(58) Field of Classification Search
None
See application file for complete search history.

(56) References Cited

U.S. PATENT DOCUMENTS

| 10,440,790 B2 | 10/2019 | Dunn et al. | |
| 2014/0354285 A1* | 12/2014 | Kim | G09G 3/006 324/414 |
| 2015/0090961 A1* | 4/2015 | Lee | H01L 22/30 257/40 |
| 2019/0204989 A1* | 7/2019 | Shin | G06F 3/0412 |
| 2020/0027929 A1* | 1/2020 | Lee | H10K 50/81 |
| 2020/0201468 A1* | 6/2020 | Park | G06F 3/0412 |
| 2021/0158751 A1* | 5/2021 | Cha | G09G 3/3233 |
| 2022/0093693 A1* | 3/2022 | Kim | H10K 59/1213 |
| 2022/0179537 A1* | 6/2022 | Kim | G06F 3/04166 |
| 2022/0291779 A1* | 9/2022 | Kim | H10K 59/131 |
| 2023/0004274 A1* | 1/2023 | Shin | G06F 3/0418 |
| 2023/0214073 A1* | 7/2023 | Han | H10K 59/40 |
| 2024/0028147 A1* | 1/2024 | Fang | G06F 3/0443 |

FOREIGN PATENT DOCUMENTS

KR   10-1739348   5/2017

* cited by examiner

*Primary Examiner* — Nitin Patel
*Assistant Examiner* — Amen W Bogale
(74) *Attorney, Agent, or Firm* — F. CHAU & ASSOCIATES, LLC

(57) ABSTRACT

A display panel includes a peripheral region adjacent to an active region. The display panel further includes a plurality of pixels disposed in the active region, a plurality of data lines electrically connected with the plurality of pixels and that extend to the peripheral region, a plurality of sensors disposed in the active region, and a plurality of readout lines electrically connected with the plurality of sensors and that extend from the active region to the peripheral region. In addition, a conductive layer is disposed in the peripheral region and between at least some of the plurality of data lines and at least some of the plurality of readout lines.

20 Claims, 13 Drawing Sheets

DISPLAY DEVICE

CROSS-REFERENCE TO RELATED APPLICATIONS

This application claims priority under 35 U.S.C. § 119 to Korean Patent Application No. 10-2023-0011037, filed on Jan. 27, 2023, in the Korean Intellectual Property Office, the disclosure of which is incorporated by reference herein in its entirety.

BACKGROUND

1. Field

Embodiments described herein relate to a display device.

2. Description of the Related Art

Display devices have been developed to perform various functions. Examples include displaying images to provide information to a user and sensing different kinds of inputs. More recent display devices sense information (e.g., biometric information) of a user. The user information may be recognized using a capacitive sensing technique, a light sensing technique, or an ultrasonic sensing technique. The capacitive sensing technique senses a change in capacitance formed between electrodes. The light sensing technique senses incident light using an optical sensor. The ultrasonic sensing technique senses vibration using a piezoelectric element.

SUMMARY

Embodiments of the present disclosure provide a display device including a sensor capable of sensing a fingerprint.

According to an embodiment, a display panel includes a display panel including an active region and a peripheral region adjacent to the active region. The display panel includes a plurality of pixels disposed in the active region, a plurality of data lines that are electrically connected with the plurality of pixels and that extend to the peripheral region, a plurality of sensors disposed in the active region, a plurality of readout lines that are electrically connected with the plurality of sensors and that extend from the active region to the peripheral region, and a conductive layer disposed in the peripheral region and disposed between one or more of the plurality of data lines and one or more of the plurality of readout lines. A constant voltage or a ground voltage may be applied to the conductive layer.

The display panel may further include a plurality of first pads disposed in the peripheral region and electrically connected with the plurality of data lines in a one-to-one manner and a plurality of second pads disposed in the peripheral region and electrically connected with the plurality of readout lines in a one-to-one manner.

The display device may further include a driver chip that is mounted on the display panel and that drives the plurality of pixels and the plurality of sensors, and the driver chip may be electrically connected to the plurality of first pads and the plurality of second pads.

The display panel may further include a plurality of third pads electrically connected with the plurality of second pads. The driver chip may include a chip multiplexer electrically connected between the plurality of second pads and the plurality of third pads. The number of third pads may be less than the number of second pads.

The display panel may further include a plurality of extension lines electrically connected with the plurality of third pads in a one-to-one manner.

The display panel may further include a multiplexer electrically connected with the plurality of third pads and a plurality of extension lines electrically connected with the plurality of third pads through the multiplexer, and the number of extension lines may be less than the number of third pads.

The display panel may further include a plurality of third pads electrically connected with the plurality of second pads in a one-to-one manner and a plurality of extension lines electrically connected with the plurality of third pads. The driver chip may be connected with the plurality of third pads, and the number of extension lines may be less than or equal to the number of third pads.

The display panel may further include a multiplexer electrically connected between the plurality of third pads and the plurality of extension lines, and the number of extension lines may be less than the number of third pads.

The display panel may further include a plurality of extension lines electrically connected with the plurality of readout lines, and the plurality of extension lines may extend toward an edge of the display panel. The number of extension lines may be less than the number of readout lines.

The display panel may further include a multiplexer disposed in the peripheral region and electrically connected between the plurality of readout lines and the plurality of extension lines.

The display device may further include a circuit film electrically connected to the display panel and a sensor driver chip that is mounted on the circuit film and that drives the plurality of sensors.

The display panel may further include a plurality of sensing electrodes disposed to overlap the active region, a plurality of trace lines electrically connected with the plurality of sensing electrodes, a plurality of touch pads electrically connected with the plurality of trace lines, and a plurality of extension lines aligned with the plurality of touch pads and electrically connected with the plurality of readout lines, and the number of extension lines may be less than the number of readout lines.

At least some of the plurality of data lines and at least some of the plurality of readout lines may overlap each other in the peripheral region.

According to an embodiment, a display device includes a display panel in which an active region and a peripheral region adjacent to the active region are defined and a circuit film coupled to the display panel. The display panel includes a plurality of pixels disposed in the active region, a plurality of data lines that are electrically connected with the plurality of pixels and that extend to the peripheral region, a plurality of sensors disposed in the active region, a plurality of readout lines that are electrically connected with the plurality of sensors and that extend from the active region to the peripheral region, and a plurality of extension lines electrically connected with the plurality of readout lines, and the number of extension lines is less than the number of readout lines.

At least some of the plurality of data lines and at least some of the plurality of readout lines may overlap each other in the peripheral region, and the display panel may further include a conductive layer disposed in the peripheral region and disposed between the plurality of data lines and the plurality of readout lines.

The display device may further include a driver chip that is mounted on the display panel and that drives the plurality of pixels and the plurality of sensors.

The display device may further include a sensor driver chip that is mounted on the circuit film and that drives the plurality of sensors. The display device may further include a multiplexer connected between the plurality of readout lines and the plurality of extension lines.

In accordance with one or more embodiments, a display device includes a plurality of pixels disposed in an active region; a plurality of sensors disposed in the active region; a plurality of data lines coupled to a plurality of pixels; a plurality of readout lines coupled to the plurality of sensors; and a fan-out region a including a shielding layer disposed between the plurality of data lines and the plurality of readout line in a peripheral region, wherein the plurality of data lines and the plurality of readout lines extend in a same direction in the active region. The shielding layer may have a plate shape. The shielding layer may include a plurality of openings. The plurality of openings may not overlap the plurality of data lines. The plurality of openings may not overlap the plurality of readout lines. The shielding layer may be coupled to a predetermined voltage. The plurality of data lines and the plurality of readout lines may be bent in the fan-out region.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
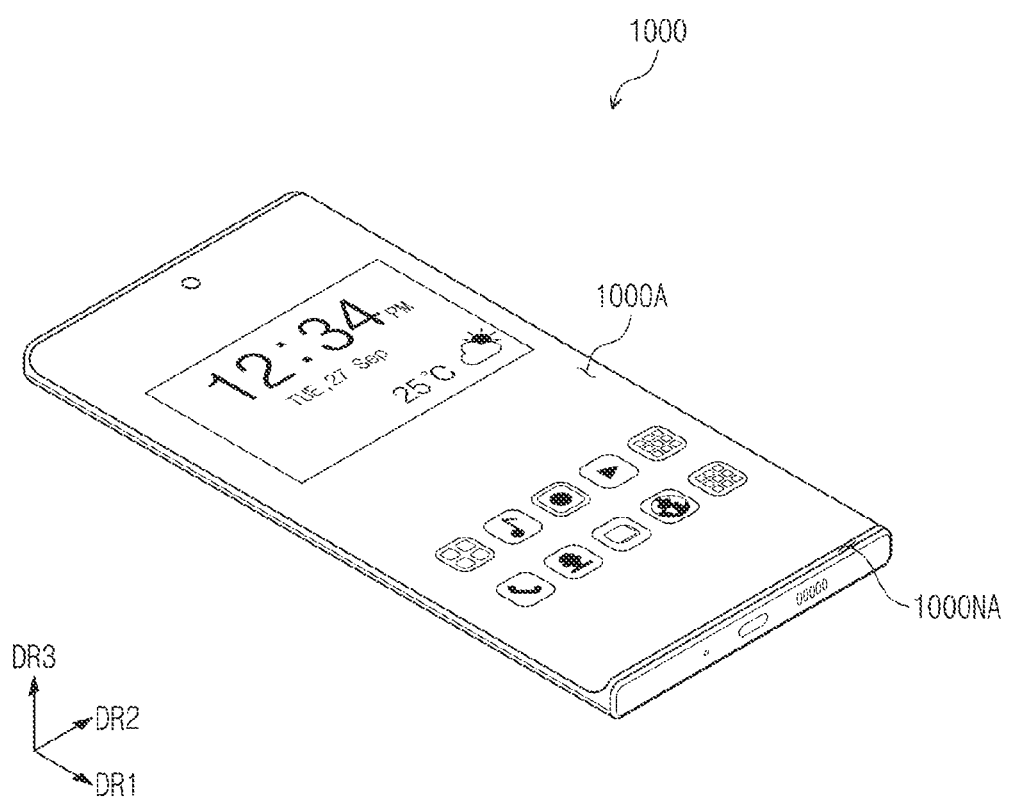
FIG. 1 is a perspective view of a display device according to an embodiment of the present disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

FIG. 1 is a perspective view of a display device 1000 according to an embodiment of the present disclosure.

Referring to FIG. 1, the display device 1000 may be activated in response to an electrical signal. Examples of the display device 1000 include a mobile phone, a foldable mobile phone, a notebook computer, a television, a tablet computer, a car navigation unit, a game machine, and a wearable device. In FIG. 1, the display device 1000 is illustrated as a mobile phone.

The display device 1000 may include an active region 1000A and a peripheral region 1000NA. The display device 1000 may display an image through the active region 1000A. The active region 1000A may include a plane defined by a first direction DR1 and a second direction DR2. A thickness direction of the display device 1000 may be parallel to a third direction DR3 crossing the first direction DR1 and the second direction DR2. Accordingly, front surfaces (or upper surfaces) and rear surfaces (or lower surfaces) of members constituting the display device 1000 may be defined based on the third direction DR3. The peripheral region 1000NA may partially or completely surround the periphery of the active region 1000A.

Figure 2:
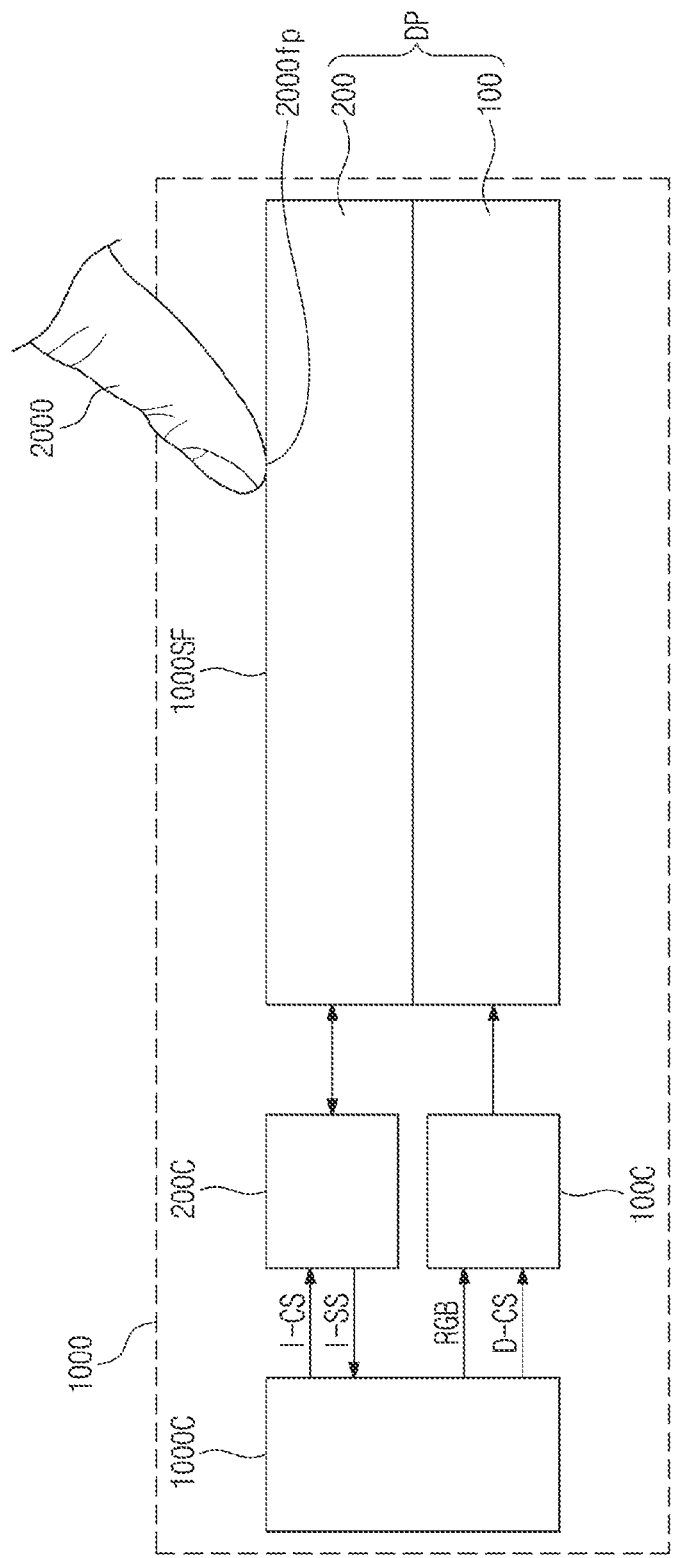
FIG. 2 is a block diagram of the display device according to an embodiment of the present disclosure.

FIG. 2 is a block diagram of the display device 1000 according to an embodiment of the present disclosure.

Referring to FIG. 2, the display device 1000 may include a display panel DP, a display driver 100C, a sensor driver 200C, and a main driver 1000C. The display panel DP may include a display layer 100 and a sensor layer 200 disposed on the display layer 100. In an embodiment of the present disclosure, the sensor layer 200 may be omitted.

The display layer 100 may substantially generate an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. In addition, the display layer 100 may include a sensor that senses, or reacts to, light reflected by a fingerprint 2000fp of a user.

The sensor layer 200 may be disposed on the display layer 100. The sensor layer 200 may sense an external input 2000 applied from the outside. The external input 2000 may include all forms capable of providing a change in capacitance. For example, the sensor layer 200 may sense not only passive inputs (such as from a body part of a user), but also active inputs of a type that provides a drive signal.

The main driver 1000C may control overall operation of the display device 1000. For example, the main driver 1000C may control operations of the display driver 100C and the sensor driver 200C. The main driver 1000c may include at least one microprocessor and may further include a graphic controller. The main driver 1000c may be referred to as an application processor, a central processing unit, or a main processor.

The display driver 100C may drive the display layer 100. The display driver 100C may receive image data RGB and a control signal D-CS from the main driver 1000C. The control signal D-CS may include various signals. For example, the control signal D-CS may include an input vertical synchronization signal, an input horizontal synchronization signal, a main clock, a data enable signal, and/or other signals. Based on the control signal D-CS, the display driver 100C may generate a vertical synchronization signal and a horizontal synchronization signal for controlling timing at which a signal is provided to the display layer 100.

The sensor driver 200C may drive the sensor layer 200. The sensor driver 200C may receive a control signal I-CS from the main driver 1000C. The control signal I-CS may include a mode determination signal (for determining a drive mode of the sensor driver 200C) and a clock signal.

The sensor driver 200C may calculate coordinate information of an input based on a signal received from the sensor layer 200 and may provide a coordinate signal I-SS including the coordinate information to the main driver 1000C. The main driver 1000C executes an operation corresponding to a user input, based on the coordinate signal I-SS. For example, the main driver 1000C may operate the display driver 100C such that a new application image is displayed on the display layer 100.

Figure 3:
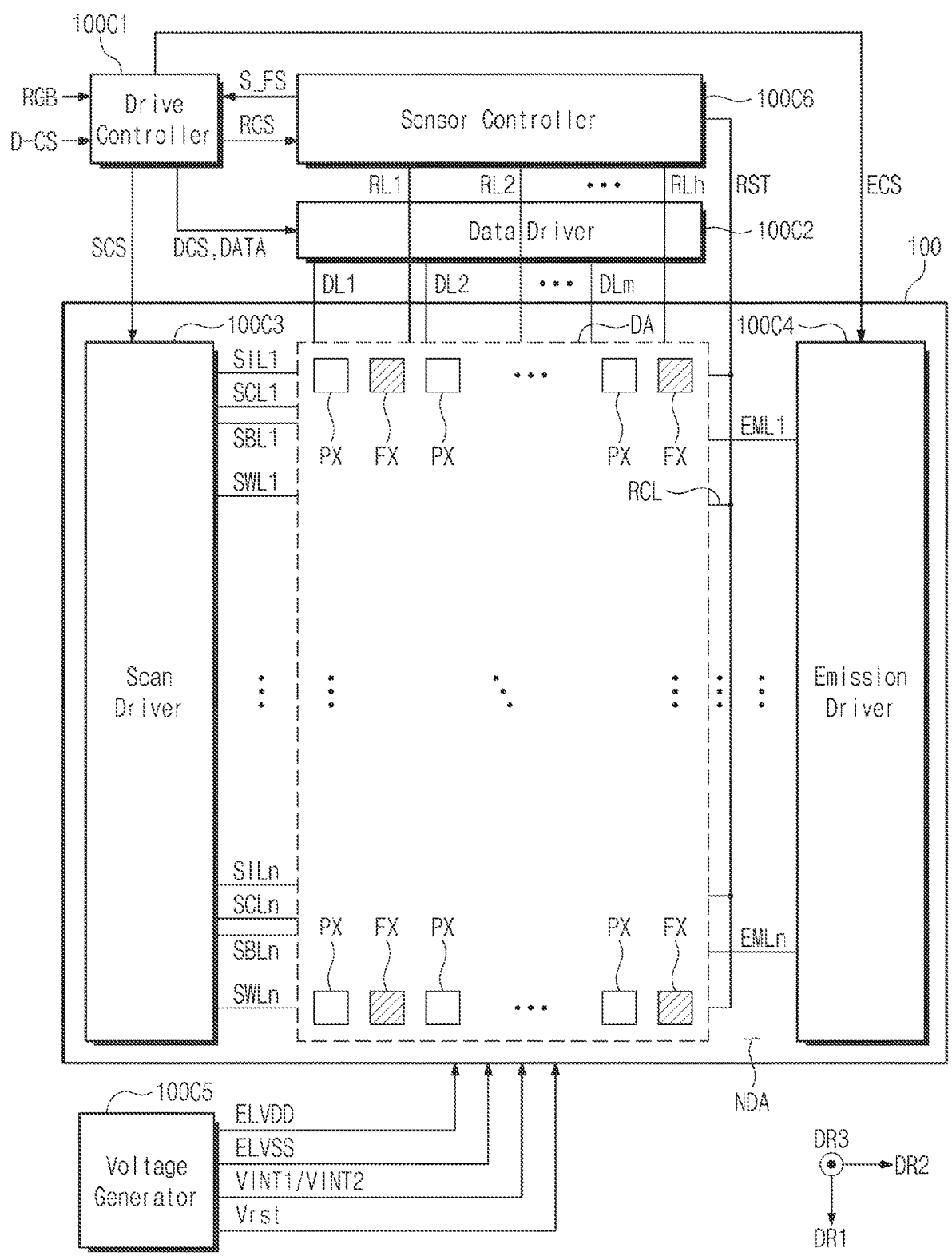
FIG. 3 is a block diagram of a display layer and a display driver according to an embodiment of the present disclosure.

FIG. 3 is a block diagram of the display layer 100 and the display driver 100C according to an embodiment of the present disclosure.

Referring to FIGS. 2 and 3, the display driver 100C may include a drive controller 100C, a data driver 100C2, a scan driver 100C3, an emission driver 100C4, a voltage generator 100C5, and a sensor controller 100C6. The display layer 100 may include an active region DA (or a display region) corresponding to the active region 1000A (e.g., refer to FIG. 1) and a peripheral region NDA (or a non-display region) corresponding to the peripheral region 1000NA (e.g., refer to FIG. 1).

The display layer 100 may include a plurality of pixels PX disposed in the active region DA and a plurality of sensors FX disposed in the active region DA. The display layer 100 further includes initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLm, and readout lines RL1 to RLh.

The initialization scan lines SIL1 to SILn, the compensation scan lines SCL1 to SCLn, the write scan lines SWL1 to SWLn, the black scan lines SBL1 to SBLn, and the emission control lines EML1 to EMLn extend in the second direction DR2. The initialization scan lines SIL1 to SILn, the compensation scan lines SCL1 to SCLn, the write scan lines SWL1 to SWLn, the black scan lines SBL1 to SBLn, and the emission control lines EML1 to EMLn are arranged in the first direction DR1 so as to be spaced apart from each other. The data lines DL1 to DLm and the readout lines RL1 to RLh extend in the first direction DR1 and are arranged in the second direction DR2 so as to be spaced apart from each other.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm, respectively. For example, each of the plurality of pixels PX may be electrically connected to a predetermined (e.g., four) number of scan lines. However, without being limited thereto, the number of scan lines connected to each pixel PX may be different in other embodiments.

The plurality of sensors FX are electrically connected to the readout lines RL1 to RLh. One scan line may be coupled to one or more of the sensors FX. One sensor FX may be electrically connected to one scan line, for example, one write scan line among the write scan lines SWL1 to SWLn. However, the present disclosure is not limited thereto. The number of scan lines connected to each sensor FX may be different in other embodiments.

In an embodiment of the present disclosure, the number of readout lines RL1 to RLh may correspond to ½ of the number of data lines DL1 to DLm. However, the present disclosure is not limited thereto. In one embodiment, the number of readout lines RL1 to RLh may correspond to ¼ or ⅛ of the number of data lines DL1 to DLm, or may be equal to the number of data lines DL1 to DLm.

The drive controller 100C1 receives the image data RGB and the control signal D-CS. The drive controller 100C1 generates an image data signal DATA by converting the data format of the image data RGB according to the type of interface with the data driver 100C2. The drive controller 100C1 outputs a first control signal SCS, a second control signal ECS, a third control signal DCS, and a fourth control signal RCS.

The data driver 100C2 receives the third control signal DCS and the image data signal DATA from the drive controller 100C1. The data driver 100C2 converts the image data signal DATA into data signals and outputs the data signals to the plurality of data lines DL1 to DLm to be described below. The data signals are analog voltages corresponding to a gray level value of the image data signal DATA.

The scan driver 100C3 receives the first control signal SCS from the drive controller 100C1. The scan driver 100C3 may output scan signals to the scan lines in response to the first control signal SCS. For example, in response to the first control signal SCS, the scan driver 100C3 outputs initialization scan signals to the initialization scan lines SIL1 to SILn and outputs compensation scan signals to the compensation scan lines SCL1 to SCLn. Furthermore, in response to the first control signal SCS, the scan driver 100C3 may output write scan signals to the write scan lines SWL1 to SWLn and may output black scan signals to the black scan lines SBL1 to SBLn.

The emission driver 100C4 receives the second control signal ECS from the drive controller 100C1. The emission driver 100C4 may output emission control signals to the emission control lines EML1 to EMLn in response to the second control signal ECS. In one embodiment, the scan driver 100C3 may be connected to the emission control lines EML1 to EMLn. In this case, the emission driver 100C4 may be omitted, and the scan driver 100C3 may output emission control signals to the emission control lines EML1 to EMLn.

The scan driver 100C3 and the emission driver 100C4 may be disposed in the peripheral region (non-display area) NDA of the display layer 100. However, the present disclosure is not particularly limited thereto. For example, at least a portion of the scan driver 100C3 and at least a portion of the emission driver 100C4 may be disposed in the active region DA.

The voltage generator 100C5 generates voltages for performing operations of the display layer 100. In this embodiment, the voltage generator 100C5 generates a first drive voltage ELVDD, a second drive voltage ELVSS, a first initialization voltage VINT1, a second initialization voltage VINT2, and a reset voltage Vrst.

The sensor controller 100C6 receives the fourth control signal RCS from the drive controller 100LC. In response to the fourth control signal RCS, the sensor controller 100C6 may receive sensing signals from the readout lines RL1 to RLh. The sensor controller 100C6 may process the sensing signals received from the readout lines RL1 to RLh and may provide the processed sensing signals S_FS to the drive controller 100C1.

Figure 4:
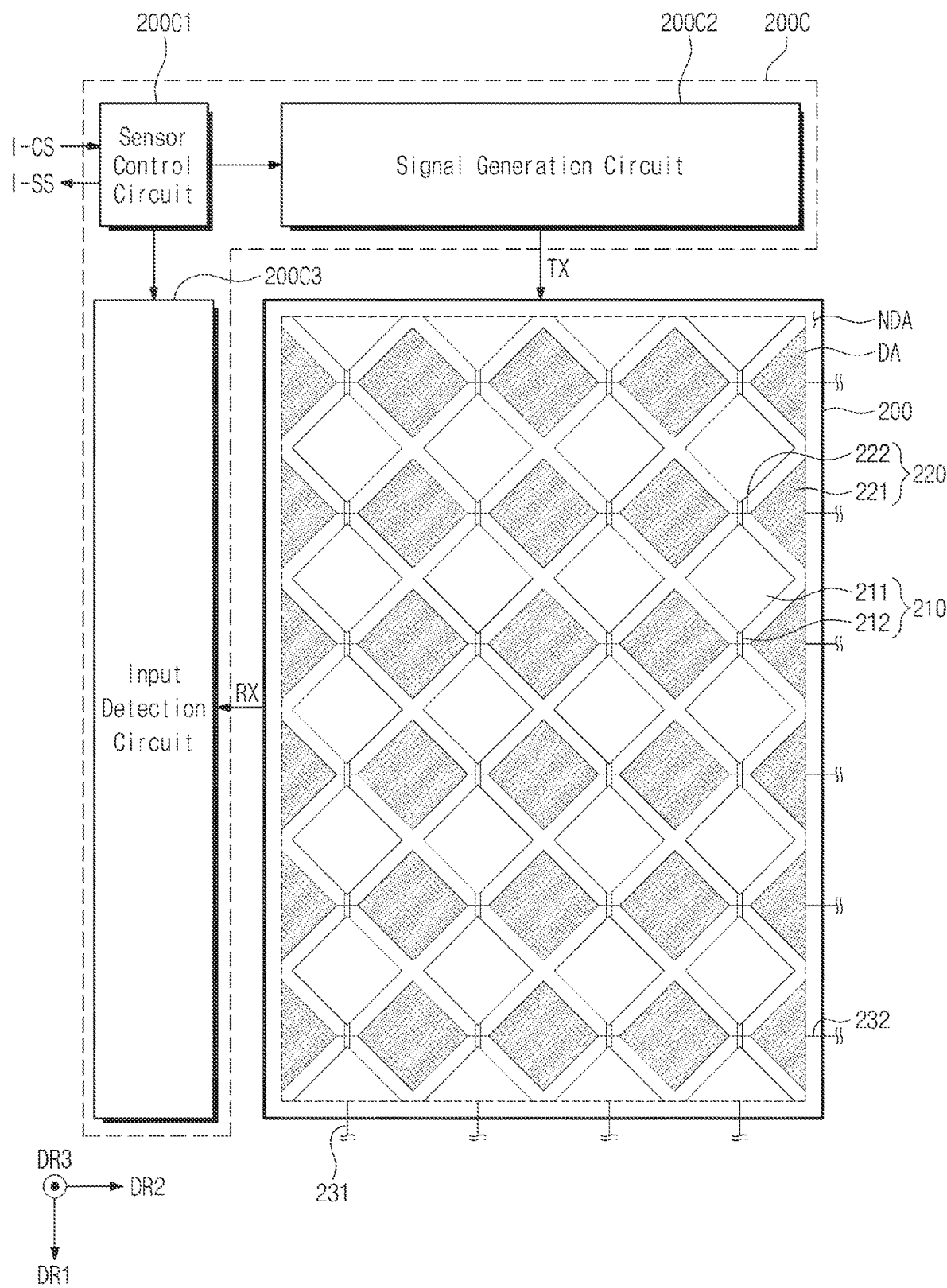
FIG. 4 is a block diagram of a sensor layer and a sensor driver according to an embodiment of the present disclosure.

FIG. 4 is a block diagram of the sensor layer 200 and the sensor driver 200C according to an embodiment of the present disclosure.

Referring to FIG. 4, the sensor layer 200 may include a plurality of first sensing electrodes 210 and a plurality of second sensing electrodes 220 disposed in the active region DA. The plurality of second sensing electrodes 220 may cross the plurality of first sensing electrodes 210. Each of the plurality of first sensing electrodes 210 may extend in the first direction DR1, and the plurality of first sensing electrodes 210 may be arranged in the second direction DR2 so as to be spaced apart from each other. Each of the plurality of second sensing electrodes 220 may extend in the second direction DR2, and the plurality of second sensing electrodes 220 may be arranged in the first direction DR1 so as to be spaced apart from each other.

Each of the plurality of first sensing electrodes 210 may include sensing patterns 211 and connecting patterns 212. Two sensing patterns 211 that are adjacent to each other may be electrically connected with each other by a number (e.g., two) connecting patterns 212. However, the present disclosure is not particularly limited thereto. The sensing patterns 211 and the connecting patterns 212 may be disposed on different layers.

Each of the plurality of second sensing electrodes 220 may include first parts 221 and second parts 222. The first parts 221 and the second parts 222 may be integrally formed with each other and may be disposed on the same layer. For example, the first parts 221 and the second parts 222 may be disposed on the same layer as the sensing patterns 221. Two connecting patterns 212 may insulatively cross one second part 222.

The sensor layer 200 may further include a plurality of first trace lines 231 (that are electrically connected with the first sensing electrodes 210) and a plurality of second trace lines 232 that are electrically connected with the second sensing electrodes 220. The first trace lines 231 and the second trace lines 232 may be disposed in the peripheral region NDA, but are not particularly limited thereto. For example, one or more of the first and second trace lines 231 and 232 may be disposed to overlap the active region DA.

The sensor driver 200C may receive the control signal I-CS from the main driver 1000C (e.g., refer to FIG. 2). The sensor driver 200C may provide the coordinate signal I-SS to the main driver 1000C (e.g., refer to FIG. 2). The sensor driver 200C may be implemented with an integrated circuit (IC) and may be directly mounted on a predetermined region of the display layer 200, or may be mounted on a separate printed circuit board in, for example, a chip-on-film (COF) manner and may be electrically connected with the sensor layer 200.

The sensor driver 200C may include a sensor control circuit 200C1, a signal generation circuit 200C2, and an input detection circuit 200C3. The sensor control circuit 200C1 may control operations of the signal generation circuit 200C2 and the input detection circuit 200C3 based on the control signal I-CS.

The signal generation circuit 200C2 may output transmission signals TX to the first sensing electrodes 210 of the sensor layer 200. The input detection circuit 200C3 may receive sensing signals RX from the sensor layer 200. For example, the input detection circuit 200C3 may receive the sensing signals RX from the second sensing electrodes 220. In an embodiment of the present disclosure, the signal generation circuit 200C2 may output the transmission signals TX to the second sensing electrodes 220 of the sensor layer 200, and the input detection circuit 200C3 may receive the sensing signals RX from the first sensing electrodes 210.

The input detection circuit 200C3 may convert an analog signal into a digital signal. For example, the input detection circuit 200C3 amplifies and then filters a received analog signal. Thus, the input detection circuit 200C3 may convert the filtered signal into a digital signal.

Figure 5:
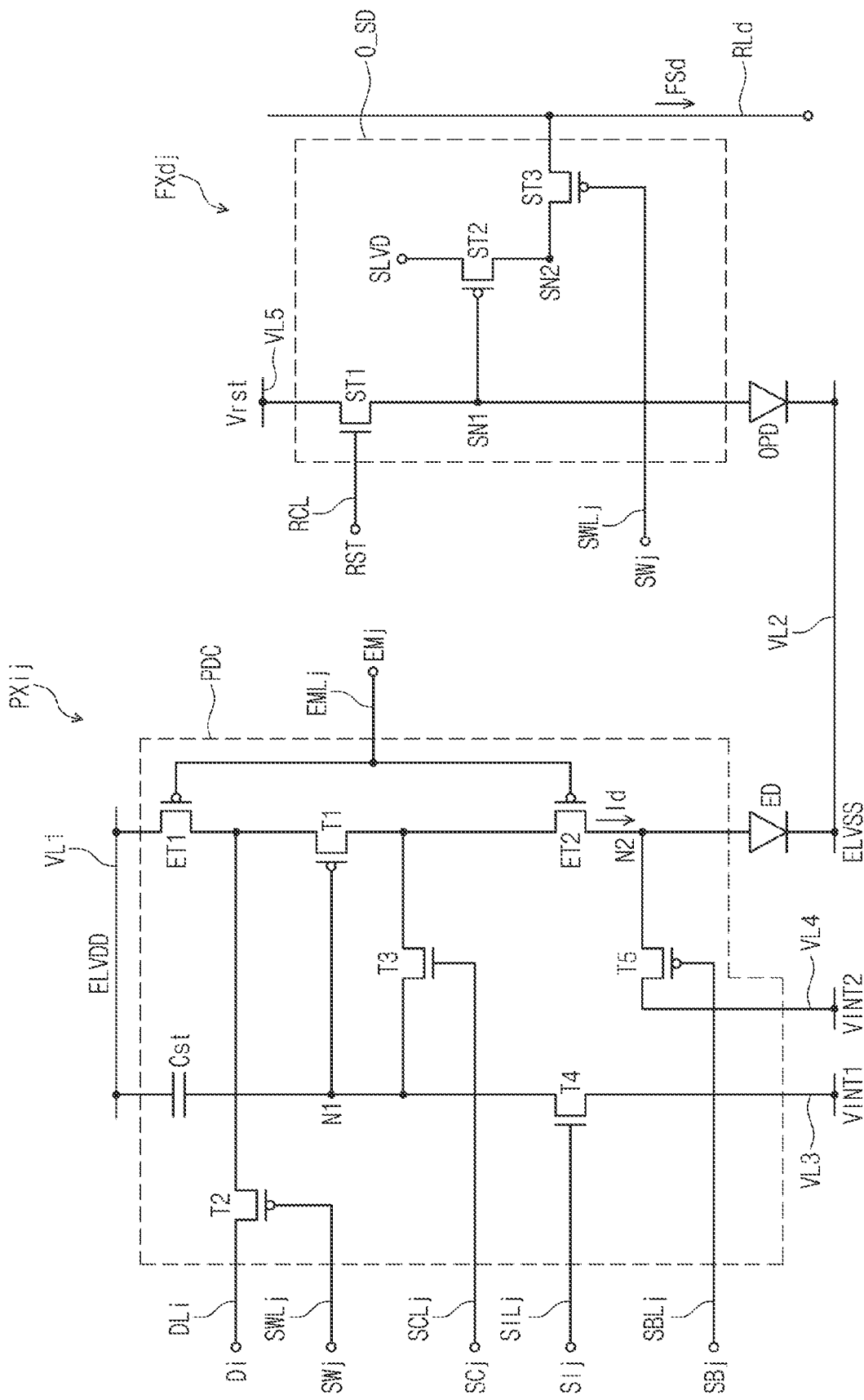
FIG. 5 illustrates an equivalent circuit diagram of a pixel and an equivalent circuit diagram of a sensor according to an embodiment of the present disclosure.

FIG. 5 illustrates an equivalent circuit diagram of a pixel and an equivalent circuit diagram of a sensor according to an embodiment of the present disclosure. FIG. 5 illustrates an equivalent circuit diagram of one pixel PXij among the plurality of pixels PX (e.g., refer to FIG. 3). The plurality of pixels PX may have the same circuit structure. Therefore, description of the circuit structure for the pixel PXij may be applied to the remaining pixels PX, and detailed description of the remaining pixels PX will be omitted. In addition, FIG. 5 illustrates an equivalent circuit diagram of one sensor FXdj among the plurality of sensors FX illustrated in FIG. 3. The plurality of sensors FX may have the same circuit structure. Therefore, description of the circuit structure for the sensor FXdj may be applied to the remaining sensors FX, and detailed description of the remaining sensors FX will be omitted.

Referring to FIGS. 3 and 5, the pixel PXij is connected to the i-th data line DLi among the data lines DL1 to DLm, the j-th initialization scan line SILj among the initialization scan lines SIL1 to SILn, the j-th compensation scan line SCLj among the compensation scan lines SCL1 to SCLn, the j-th write scan line SWLj among the write scan lines SWL1 to SWLn, the j-th black scan line SBLj among the black scan lines BSL1 to BSLn, and the j-th emission control line EMLj among the emission control lines EML1 to EMLn.

The pixel PXij includes a light emitting element ED and a pixel drive circuit PDC. The light emitting element ED may be a light emitting diode. In an embodiment of the present disclosure, the light emitting element ED may be an organic light emitting diode including an organic light emitting layer, but is not particularly limited thereto.

The pixel drive circuit PDC includes a plurality of transistors and at least one capacitor. For example, the pixel drive circuit PDC may include first to fifth transistors T1, T2, T3, T4, and T5, first and second emission control transistors ET1 and ET2, and one capacitor Cst. At least one of the first to fifth transistors T1, T2, T3, T4, and T5 and the first and second emission control transistors ET1 and ET2 may be a transistor having a low-temperature polycrystalline silicon (LTPS) semiconductor layer. At least one of the first to fifth transistors T1, T2, T3, T4, and T5 and the first and second emission control transistors ET1 and ET2 may be a transistor having an oxide semiconductor layer. For example, the third and fourth transistors T3 and T4 may be oxide semiconductor transistors. The first, second, and fifth transistors T1, T2, and T5 and the first and second emission control transistors ET1 and ET2 may be LTPS transistors.

The first transistor T1 may directly affect (or control) the brightness of the display device 1000 (e.g., refer to FIG. 1) and thus may be referred to as a driving transistor. The first transistor T1 may include a semiconductor layer formed of polycrystalline silicon having high reliability. Thus, a display device having a high resolution may be implemented. Meanwhile, an oxide semiconductor has high carrier mobility and low leakage current. Therefore, a voltage drop is not large even when operating time is long. As a result, the color of an image is not significantly changed by the voltage drop even during a low-frequency operation, thereby making the low-frequency operation possible. Since the oxide semiconductor has an advantage of low leakage current as described above, at least one of the third transistor T3 (which is connected with a third electrode (or, a gate electrode) of the first transistor T1) or the fourth transistor T4 may be employed as an oxide semiconductor to reduce power consumption while preventing leakage current that is likely to flow to the gate electrode.

Some of the first to fifth transistors T1, T2, T3, T4, and T5 and the first and second emission control transistors ET1 and ET2 may be P-type transistors, and one or more of the remaining transistors may be N-type transistors. For example, the first, second, and fifth transistors T1, T2, and T5 and the first and second emission control transistors ET1 and ET2 may be P-type transistors, and the third and fourth transistors T3 and T4 may be N-type transistors.

The configuration of the pixel drive circuit PDC is not limited to the embodiment illustrated in FIG. 5. The pixel drive circuit PDC illustrated in FIG. 5 is merely illustrative, and various changes and modifications can be made to the configuration of the pixel drive circuit PDC. For example, the first to fifth transistors T1, T2, T3, T4, and T5 and the first and second emission control transistors ET1 and ET2 may all be P-type transistors or N-type transistors.

The j-th initialization scan line SILj, the j-th compensation scan line SCLj, the j-th write scan line SWLj, the j-th black scan line SBLj, and the j-th emission control line EMLj may transmit the j-th initialization scan signal SIj, the j-th compensation scan signal SCj, the j-th write scan signal SWj, the j-th black scan signal SBj, and the j-th emission control signal EMj to the pixel PXij, respectively. The i-th data line DLi transmits the i-th data signal Di to the pixel PXij. The i-th data signal Di may have a voltage level corresponding to the image data RGB that is input to the display device 1000 (e.g., refer to FIG. 2).

First and second drive voltage lines VL1 and VL2 may transfer the first drive voltage ELVDD and the second drive voltage ELVSS to the pixel PXij, respectively. Furthermore, first and second initialization voltage lines VL3 and VL4 may transfer the first initialization voltage VINT1 and the second initialization voltage VINT2 to the pixel PXij, respectively.

The first (driving) transistor T1 is connected between the first drive voltage line VL1 receiving the first drive voltage ELVDD and the light emitting element ED. The first transistor T1 includes a first electrode connected with the first drive voltage line VL1 via the first emission control transistor ET1, a second electrode connected with the light emitting element ED via the second emission control transistor ET2, and a third electrode (e.g., a gate electrode) connected with one end of the capacitor Cst (e.g., a first node N1). The first transistor T1 may receive the i-th data signal Di that the i-th data line DLi transmits depending on a switching operation of the second transistor T2, and may supply a drive current Id to the light emitting element ED.

The second transistor T2 is connected between the i-th data line DLi and the first electrode of the first transistor T1. The second transistor T2 includes a first electrode connected with the i-th data line DLi, a second electrode connected with the first electrode of the first transistor T1, and a third electrode (e.g., a gate electrode) connected with the j-th write scan line SWLj. The second transistor T2 may be turned on in response to the j-th write scan signal SWj transmitted through the j-th write scan line SWLj and may transmit, to the first electrode of the first transistor T1, the i-th data signal Di transmitted from the i-th data line DLi.

The third (compensation) transistor T3 is connected between the second electrode of the first transistor T1 and the first node N1. The third transistor T3 includes a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on in response to the j-th compensation scan signal SCj transmitted through the j-th compensation scan line SCLj and may diode-connect the first transistor T1 by connecting the third electrode and the second electrode of the first transistor T1.

The fourth (first initialization) transistor T4 is connected between the first initialization voltage line VL3 through which the first initialization voltage VINT1 is applied and the first node N1. The fourth transistor T4 includes a first electrode, second electrode, and a third electrode. The first electrode is connected with the first initialization voltage line VL3 through which the first initialization voltage VINT1 is transferred. The second electrode is connected with the first node N1. The third electrode (e.g., a gate electrode) is connected with the j-th initialization scan line SILj. The fourth transistor T4 is turned on in response to the j-th initialization scan signal SIj transmitted through the j-th initialization scan line SILj. The turned-on fourth transistor T4 initializes the potential of the third electrode of the first transistor T1 (e.g., the potential of the first node N1) by transferring the first initialization voltage VINT1 to the first node N1.

The first emission control transistor ET1 includes a first electrode connected with the first drive voltage line VL1, a second electrode connected with the first electrode of the first transistor T1, and a third electrode (e.g., a gate electrode) connected to the j-th emission control line EMLj.

The second emission control transistor ET2 includes a first electrode connected with the second electrode of the first transistor T1, a second electrode connected to the light emitting element ED, and a third electrode (e.g., a gate electrode) connected to the j-th emission control line EMLj. The first and second emission control transistors ET1 and ET2 are simultaneously turned on in response to the j-th emission control signal EMj transmitted through the j-th emission control line EMLj. The first drive voltage ELVDD applied through the turned-on first emission control transistor ET1 may be compensated for through the diode-connected first transistor T1 and may be transferred to the light emitting element ED.

The fifth (second initialization) transistor T5 includes a first electrode, a second electrode, and a third electrode. The first electrode is connected to the second initialization voltage line VL4 through which the second initialization voltage VINT2 is transferred. The second electrode is connected with the second electrode (e.g., a second node N2) of the second emission control transistor ET2. The third electrode (e.g., a gate electrode) is connected with the j-th black scan line SBLj. The second initialization voltage VINT2 may have a voltage level different from (e.g., lower than or equal to) the voltage level of the first initialization voltage VINT1.

The one end of the capacitor Cst is connected with the third electrode of the first transistor T1 as described above, and an opposite end of the capacitor Cst is connected with the first drive voltage line VL1. A cathode of the light emitting element ED may be connected with the second drive voltage line VL2 that transfers the second drive voltage ELVSS. The second drive voltage ELVSS may have a different (e.g., lower) voltage level than the first drive voltage ELVDD.

The sensor FX is connected to the d-th readout line RLd among the readout lines RL1 to RLh, the j-th write scan line SWLj (e.g., referred to as an output control line), and a reset control line RCL.

The sensor FX includes a light sensing element OPD (referred to as a sensing element) and a sensor drive circuit O_SD. The light sensing element OPD may be a photo diode. In an embodiment of the present disclosure, the light sensing element OPD may be an organic photo diode including an organic material as a photoelectric conversion layer. A first electrode AE-S (e.g., refer to FIG. 6) of the light sensing element OPD may be connected to a first sensing node SN1, and a second electrode CE (e.g., refer to FIG. 6) of the light sensing element OPD may be connected with the second drive voltage line VL2 that transfers the second drive voltage ELVSS. Although FIG. 5 illustrates an example that the sensor FX includes one light sensing element OPD, the present disclosure is not particularly limited thereto. For example, the sensor FX may include z light sensing elements connected in parallel, where "z" is an integer of 2 or more.

The sensor drive circuit O_SD includes three transistors ST1, ST2, and ST3. The three transistors ST1, ST2, and ST3 may include the reset transistor ST1, the amplifying transistor ST2, and the output transistor ST3. At least one of the reset transistor ST1, the amplifying transistor ST2, or the output transistor ST3 may be an oxide semiconductor transistor. In an embodiment of the present disclosure, the reset transistor ST1 may be an oxide semiconductor transistor, and the amplifying transistor ST2 and the output transistor ST3 may be LTPS transistors. However, in one embodiment, without being limited thereto, at least the reset transistor ST1 and the output transistor ST3 may be oxide semiconductor transistors, and the amplifying transistor ST2 may be an LTPS transistor.

Furthermore, one or more of the reset transistor ST1, the amplifying transistor ST2, and the output transistor ST3 may be P-type transistors, and remaining one(s) of the transistors may be N-type transistors. In an embodiment of the present disclosure, the amplifying transistor ST2 and the output transistor ST3 may be P-type transistors, and the reset transistor ST1 may be an N-type transistor. However, without being limited thereto, the reset transistor ST1, the amplifying transistor ST2, and the output transistor ST3 may all be N-type transistors or P-type transistors.

The circuit configuration of the sensor drive circuit O_SD may be different from that illustrated in FIG. 5 in other embodiments. The sensor drive circuit O_SD illustrated in FIG. 5 is merely illustrative, and various changes and modifications can be made to the configuration of the sensor drive circuit O_SD.

The reset transistor ST1 includes a first electrode that is connected to a third initialization voltage line VL5 and that receives the reset voltage Vrst, a second electrode connected with the first sensing node SN1, and a third electrode that receives a reset control signal RST. The reset transistor ST1 may reset the potential of the first sensing node SN1 to the reset voltage VRST in response to the reset control signal RST. The reset control signal RST may be provided through the reset control line RCL.

The amplifying transistor ST2 includes a first electrode that receives a sensing drive voltage SLVD, a second electrode connected with a second sensing node SN2, and a third electrode connected with the first sensing node SN1. The amplifying transistor ST2 may be turned on depending on the potential of the first sensing node SN1 and may apply the sensing drive voltage SLVD to the second sensing node SN2.

In an embodiment of the present disclosure, the sensing drive voltage SLVD may be one of the first drive voltage ELVDD or the first and second initialization voltages VINT1 and VINT2. When the sensing drive voltage SLVD is the first drive voltage ELVDD, the first electrode of the amplifying transistor ST2 may be electrically connected to the first drive voltage line VL1. When the sensing drive voltage SLVD is the first initialization voltage VINT1, the first electrode of the amplifying transistor ST2 may be electrically connected to the first initialization voltage line VL3. When the sensing drive voltage SLVD is the second initialization voltage VINT2, the first electrode of the amplifying transistor ST2 may be electrically connected to the second initialization voltage line VL4.

The output transistor ST3 includes a first electrode connected with the second sensing node SN2, a second electrode connected with the d-th readout line RLd, and a third electrode that receives an output control signal. In response to the output control signal, the output transistor ST3 may transmit a sensing signal FSd to the d-th readout line RLd. The output control signal may be the j-th write scan signal SWj (or, referred to as the j-th output control signal) supplied through the j-th write scan line SWLj. For example, the output transistor ST3 may receive the j-th write scan signal SWj, which is supplied from the j-th write scan line SWLj, as the output control signal.

A reset period may include an activation period (e.g., a high-level period) of the reset control line RCL. When the reset control signal RST having a high level is supplied through the reset control line RCL, the reset transistor ST1 is turned on. When the reset transistor ST1 is implemented with a PMOS transistor, the reset control signal RST having a low level may be supplied to the reset control line RCL during the reset period. The first sensing node SN1 may be reset to a potential corresponding to the reset voltage Vrst during the reset period. In an embodiment of the present disclosure, the reset voltage Vrst may have a lower voltage level than the second drive voltage ELVSS.

The light sensing element OPD of the sensor FX may be exposed to light during a light emission period of the light emitting element ED. The voltage of the first sensing node SN1 may maintain the reset voltage Vrst in the reset period. As the light sensing element OPD is exposed to light, the voltage of the first sensing node SN1 may be gradually shifted to the second drive voltage ELVSS. The amplifying transistor ST2 may be a source-follower amplifier that generates a source-drain current in proportion to the amount of charge of the first sensing node SN1 that is input to the third electrode.

The j-th write scan signal SWj having a low level is supplied to the output transistor ST3 through the j-th write scan line SWLj in an output period. When the output transistor ST3 is turned on in response to the j-th write scan signal SWj having the low level, the sensing signal FSd corresponding to a current flowing through the amplifying transistor ST2 may be output to the d-th readout line RLd.

Figure 6:
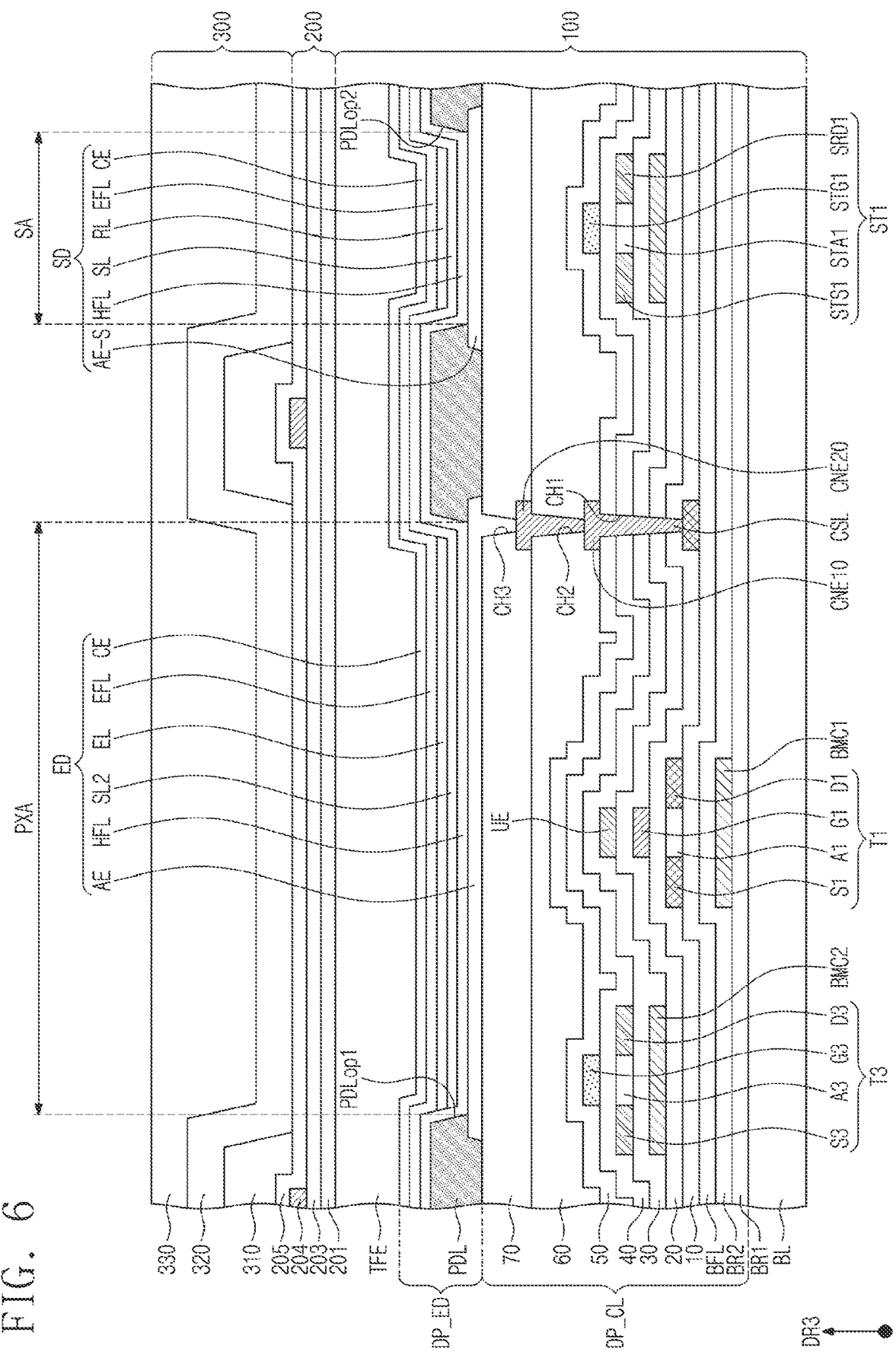
FIG. 6 is a sectional view of the display device according to an embodiment of the present disclosure.

FIG. 6 is a sectional view of the display device 1000 according to an embodiment of the present disclosure.

Referring to FIG. 6, the display layer 100 may include a base layer BL, and a circuit layer DP_CL, an element layer DP_ED, and an encapsulation layer TFE disposed on the base layer BL. At least one inorganic layer is formed on an upper surface of the base layer BL. The inorganic layer may include at least one of aluminum oxide, titanium oxide, silicon oxide, silicon oxy-nitride, zirconium oxide, or hafnium oxide. The inorganic layer may be formed in multiple layers. The multiple inorganic layers may constitute barrier layers BR1 and BR2 and/or a buffer layer BFL that will be described below. The barrier layers BR1 and BR2 and the buffer layer BF may be selectively disposed.

The barrier layers BR1 and BR2 prevent infiltration of foreign matter from the outside. The barrier layers BR1 and BR2 may include, for example, a silicon oxide layer and a silicon nitride layer. In one embodiment, a plurality of silicon oxide layers and a plurality of silicon nitride layers may be provided. The silicon oxide layers and the silicon nitride layers may be alternately stacked one above another.

The barrier layers BR1 and BR2 may include the first barrier layer BR1 and the second barrier layer BR2. A first back metal layer BMC1 may be disposed between the first barrier layer BR1 and the second barrier layer BR2. In an embodiment of the present disclosure, the first back metal layer BMC1 may be omitted.

The buffer layer BFL may be disposed on the barrier layers BR1 and BR2. The buffer layer BFL improves a coupling force between the base layer BL and a semiconductor pattern and/or a conductive pattern. The buffer layer BFL may include, for example, one or more silicon oxide layers and one or more silicon nitride layers. The silicon oxide layers and the silicon nitride layers may be alternately stacked one above another.

A first semiconductor pattern may be disposed on the buffer layer BFL. The first semiconductor pattern may include a silicon semiconductor. For example, the silicon semiconductor may include amorphous silicon or polycrystalline silicon. In one embodiment, the first semiconductor pattern may include low-temperature poly silicon.

FIG. 6 illustrates only one portion of the first semiconductor pattern disposed on the buffer layer BFL. Another portion of the first semiconductor pattern may be additionally disposed in other regions. The first semiconductor pattern may be arranged across pixels according to a specific rule. The first semiconductor pattern may have different electrical properties depending on whether or not the first semiconductor pattern is doped. The first semiconductor pattern may include a first region having a high conductivity and a second region having a low conductivity. The first region may be doped with an N-type dopant or a P-type dopant. A P-type transistor may include a doped region that is doped with a P-type dopant, and an N-type transistor may include a doped region that is doped with an N-type dopant. The second region may be an un-doped region or may be a region more lightly doped than the first region.

The first region may have a higher conductivity than the second region and may substantially serve as an electrode or a signal line. The second region may substantially correspond to an active region (or, a channel) of a transistor. For example, one portion of the first semiconductor pattern may be an active region of the transistor, another portion may be a source or drain of the transistor, and another portion may be a connecting electrode or a connecting signal line.

The first electrode S1, an active region A1, and the second electrode D1 of the first transistor T1 are formed from the first semiconductor pattern. The first electrode S1 and the second electrode D1 of the first transistor T1 extend from the active region A1 in opposite directions.

In FIG. 6, a portion of a connecting signal line CSL formed from the first semiconductor pattern is illustrated. The connecting signal line CSL may be connected to the second electrode of the fifth transistor T5 (e.g., refer to FIG. 5) and the second emission control transistor ET2 on the plane.

A first insulating layer 10 may be disposed on the buffer layer BFL. The first insulating layer 10 may commonly overlap the plurality of pixels and may cover the first semiconductor pattern. The first insulating layer 10 may be an inorganic layer and/or an organic layer and may have a single-layer structure or a multi-layer structure. The first insulating layer 10 may include at least one of aluminum oxide, titanium oxide, silicon oxide, silicon nitride, silicon oxy-nitride, zirconium oxide, or hafnium oxide. In this embodiment, the first insulating layer 10 may be a single silicon oxide layer. Not only the first insulating layer 10 but also insulating layers of the circuit layer DP_CL (to be described below) may be inorganic layers and/or organic layers and may have a single-layer structure or a multi-layer structure. The inorganic layers may include at least one of the aforementioned materials, but are not limited thereto.

The third electrode G1 of the first transistor T1 is disposed on the first insulating layer 10. The third electrode G1 may be a portion of a metal pattern. The third electrode G1 of the first transistor T1 overlaps the active region A1 of the first transistor T1. The third electrode G1 of the first transistor T1 may function as a mask in a process of doping the first semiconductor pattern. The third electrode G1 may include titanium (Ti), silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), indium tin oxide (ITO), or indium zinc oxide (IZO), but is not particularly limited thereto.

A second insulating layer 20 may be disposed on the first insulating layer 10 and may cover the third electrode G1 of the first transistor T1. The second insulating layer 20 may be an inorganic layer and/or an organic layer and may have a single-layer structure or a multi-layer structure. The second insulating layer 20 may include at least one of silicon oxide, silicon nitride, or silicon oxy-nitride. In this embodiment, the second insulating layer 20 may have a multi-layer structure including a silicon oxide layer and a silicon nitride layer.

An upper electrode UE and a second back metal layer BMC2 may be disposed on the second insulating layer 20. The upper electrode UE may overlap the third electrode G1. The upper electrode UE may be a portion of a metal pattern. A portion of the third electrode G1 and the upper electrode UE overlapping the portion of the third electrode G1 may define the capacitor Cst (e.g., refer to FIG. 5). In an embodiment of the present disclosure, the second insulating layer 20 may be replaced with an insulating pattern. In this case, the upper electrode UE may be disposed on the insulating pattern. The upper electrode UE may serve as a mask that forms the insulating pattern from the second insulating layer 20.

The second back metal layer BMC2 may be disposed under an oxide thin film transistor, (for example, the third transistor T3), to correspond to the third transistor T3. A constant voltage or a signal may be applied to the second back metal layer BMC2.

A third insulating layer 30 may be disposed on the second insulating layer 20 and may cover the upper electrode UE and the second back metal layer BMC2. The third insulating layer 30 may have a single-layer structure or a multi-layer structure. For example, the third insulating layer 30 may have a multi-layer structure including a silicon oxide layer and a silicon nitride layer.

A second semiconductor pattern may be disposed on the third insulating layer 30. The second semiconductor pattern may include an oxide semiconductor. The oxide semiconductor may include a plurality of regions distinguished depending on whether or not metal oxide is reduced. A region where metal oxide is reduced (hereinafter, referred to as the reduced region) has a different (e.g., higher) conductivity than a region where metal oxide is not reduced (hereinafter, referred to as the non-reduced region). The reduced region substantially serves as a source/drain of a transistor or a signal line. The non-reduced region substantially corresponds to an active region (or, a semiconductor region or a channel) of the transistor. For example, one portion of the second semiconductor pattern may be an active region of the transistor, another portion may be a source/drain region of the transistor, and another portion may be a signal transmission region.

The first electrode S3, an active region A3, and the second electrode D3 of the third transistor T3 are formed from the second semiconductor pattern. The first electrode S3 and the second electrode D3 include metal reduced from a metal oxide semiconductor. The first electrode S3 and the second electrode D3 may extend from the active region A3 in opposite directions on the section.

A fourth insulating layer 40 may be disposed on the third insulating layer 30. The fourth insulating layer 40 may commonly overlap the plurality of pixels and may cover the second semiconductor pattern. The fourth insulating layer 40 may include at least one of aluminum oxide, titanium oxide, silicon oxide, silicon nitride, silicon oxy-nitride, zirconium oxide, or hafnium oxide.

The third electrode G3 of the third transistor T3 is disposed on the fourth insulating layer 40. The third electrode G3 may be a portion of a metal pattern. The third electrode G3 of the third transistor T3 overlaps the active region A3 of the third transistor T3. The third electrode G3 may function as a mask in a process of reducing the second semiconductor pattern. In an embodiment of the present disclosure, the fourth insulating layer 40 may be replaced with an insulating pattern.

A fifth insulating layer 50 may be disposed on the fourth insulating layer 40 and may cover the third electrode G3. The fifth insulating layer 50 may be an inorganic layer.

A first connecting electrode CNE10 may be disposed on the fifth insulating layer 50. The first connecting electrode CNE10 may be connected to the connecting signal line CSL through a first contact hole CH1 penetrating the first to fifth insulating layers 10, 20, 30, 40, and 50.

A sixth insulating layer 60 may be disposed on the fifth insulating layer 50. The sixth insulating layer 60 may be an organic layer. The organic layer may include, but is not particularly limited to, a general purpose polymer, such as but not limited to benzocyclobutene (BCB), polyimide, hexamethyldisiloxane (HMDSO), Polymethylmethacrylate (PMMA), or Polystyrene (PS), a polymer derivative having a phenolic group, an acrylate-based polymer, an imide-based polymer, an aryl ether-based polymer, an amide-based polymer, a fluorine-based polymer, a p-xylene-based polymer, a vynyl alcohol-based polymer, or a blend thereof.

A second connecting electrode CNE20 may be disposed on the sixth insulating layer 60. The second connecting electrode CNE20 may be connected to the first connecting electrode CNE10 through a second contact hole CH2 penetrating the sixth insulating layer 60. A seventh insulating layer 70 may be disposed on the sixth insulating layer 60 and may cover the second connecting electrode CNE20. The seventh insulating layer 70 may be an organic layer.

The circuit layer DP_CL may further include the sensor drive circuit O_SD (e.g., refer to FIG. 5). For convenience of description, the reset transistor ST1 of the sensor drive circuit O_SD is illustrated. The first electrode STS1, an active region STA1, and the second electrode STD1 of the reset transistor ST1 are formed from the second semiconductor pattern. The first electrode STS1 and the second electrode STD1 include metal reduced from a metal oxide semiconductor. The fourth insulating layer 40 is disposed to cover the first electrode STS1, the active region STA1, and the second electrode STD1 of the reset transistor ST1. The third electrode STG1 of the reset transistor ST1 is disposed on the fourth insulating layer 40. In this embodiment, the third electrode STG1 may be a portion of a metal pattern. The third electrode STG1 of the reset transistor ST1 overlaps the active region STA1 of the reset transistor T1.

In an embodiment of the present disclosure, the reset transistor ST1 may be disposed on the same layer as the third transistor T3. As a result, the first electrode STS1, the active region STA1, and the second electrode STD1 of the reset transistor ST1 may be formed through the same process as the first electrode S3, the active region A3, and the second electrode D3 of the third transistor T3. The third electrode STG1 of the reset transistor ST1 may be simultaneously formed through the same process as the third electrode G3 of the third transistor T3. The first electrodes and the second electrodes of the amplifying transistor ST2 and the output transistor ST3 of the sensor drive circuit O_SD may be formed through the same process as the first electrode S1 and the second electrode D1 of the first transistor T1. The reset transistor ST1 and the third transistor T3 may be formed on the same layer through the same process. Thus, an additional process for forming the reset transistor ST1 is not required. Accordingly, process efficiency may be improved and cost savings may be achieved.

The element layer DP_ED may be disposed on the circuit layer DP_CL. The element layer DP_ED may include the light emitting elements ED and the light sensing elements OPD. In FIG. 6, one light emitting element ED and one light sensing element OPD are representatively illustrated.

An emissive region PXA may correspond to the light emitting element ED, and a sensing region SA may correspond to the light sensing element OPD. The emissive region PXA and the sensing region SA may be defined by a pixel defining layer PDL to be described in greater detail below.

The light emitting element ED may include a first electrode AE, a first functional layer HFL, an emissive layer EL, a second functional layer EFL, and a second electrode CE. The light sensing element OPD may include the first electrode AE-S, a first functional layer HFL, a photoelectric conversion layer RL, a second functional layer EFL, and the second electrode CE. The first functional layer HFL, the second functional layer EFL, and the second electrode CE may be commonly provided for the pixels PX and the sensors FX (e.g., refer to FIG. 3).

Referring to FIG. 6, the first electrode AE of the light emitting element ED and the first electrode AE-S of the light sensing element OPD are disposed on the seventh insulating layer 70. The first electrode AE of the light emitting element ED may be connected with the second connecting electrode CNE20 through a third contact hole CH3 penetrating the seventh insulating layer 70.

The light emitting element ED may further include an auxiliary layer SL2. The auxiliary layer SL may be commonly disposed in the emissive region PXA and the sensing region SA. The auxiliary layer SL may be disposed between the first functional layer HFL and the emissive layer EL and between the first functional layer HFL and the photoelectric conversion layer RL. In an embodiment of the present disclosure, the auxiliary layer SL may be omitted.

The pixel defining layer PDL may be disposed on the seventh insulating layer 70 and may cover portions of the first electrodes AE and AE-S. Openings PDLop1 and PDLop2 are provided for the pixel defining layer PDL. The plurality of emissive regions PXA and the plurality of sensing regions SA may be defined by the openings PDLop1 and PDLop2.

The emissive region PXA may be defined by the first opening PDLop1, and the sensing region SA may be defined by the second opening PDLop2. The first opening PDLop1 may expose at least a portion of the first electrode AE of the light emitting element ED, and the second opening PDLop2 may expose at least a portion of the first electrode AE-S of the light sensing element OPD.

In an embodiment of the present disclosure, the pixel defining layer PDL may further include a black material. The pixel defining layer PDL may further include a black organic dye/pigment, such as carbon black, aniline black, or the like. In one embodiment, the pixel defining layer PDL may be formed by mixing an organic material of a predetermined color (e.g., blue) and a black organic material. The pixel defining layer PDL may further include a liquid-repellent organic material.

The emissive layer EL of the light emitting element ED may be disposed in a region corresponding to the first opening PDLop1. The emissive layer EL may generate predetermined colored light. Although the patterned emissive layer EL has been described as an example in this embodiment, one emissive layer may be commonly disposed in the plurality of emissive regions. In this case, the emissive layer may generate, for example, white light or blue light. Furthermore, the emissive layer may have a multi-layer (e.g., tandem) structure.

The emissive layer EL may include a low molecular weight organic material or a high molecular weight organic material as a luminescent material. In one embodiment, the emissive layer EL may include a quantum dot material as a luminescent material. A core of a quantum dot may be selected from Group II-VI compounds, Group III-V compounds, Group IV-VI compounds, Group IV elements, Group IV compounds, or a combination thereof.

The photoelectric conversion layer RL may be disposed in a region corresponding to the second opening PDLop2. The photoelectric conversion layer RL may include an organic photo sensing material. The second electrode CE may be disposed on the photoelectric conversion layer RL. The first electrode AE-S and the second electrode CE may each receive an electrical signal. The first electrode AE-S and the second electrode CE may receive different signals. Accordingly, a predetermined electric field may be formed between the first electrode AE-S and the second electrode CE. The photoelectric conversion layer RL generates an electrical signal corresponding to light incident to the sensor.

Charges generated in the photoelectric conversion layer RL change the electric field between the first electrode AE-S and the second electrode CE. The amount of charges generated in the photoelectric conversion layer RL may vary depending on whether light is incident to the light sensing element OPD and the amount and intensity of light incident to the light sensing element OPD. Accordingly, the electric field formed between the first electrode AE-S and the second electrode CE may vary. The light sensing element OPD according to the present disclosure may obtain fingerprint information of the user through the change in the electric field between the first anode electrode AE-S and the second electrode CE.

The element layer DP-ED may further include a capping layer disposed on the second electrode CE. The capping layer may improve light emission efficiency by the principle of constructive interference. The capping layer may include, for example, a material having a predetermined refractive index (e.g., 1.6 or more) for light having a certain wavelength, e.g., 589 nm. The capping layer may be an organic capping layer including an organic material, an inorganic capping layer including an inorganic material, or a composite capping layer including an organic material and an inorganic material. For example, the capping layer may include a carbocyclic compound, a heterocyclic compound, an amine group-containing compound, a porphine derivative, a phthalocyanine derivative, a naphthalocyanine derivative, an alkali metal complex, an alkaline earth metal complex, or a combination thereof. A substituent including O, N, S, Se, Si, F, Cl, Br, I or a combination thereof, may be selectively substituted for the carbocyclic compound, the heterocyclic compound, and the amine group-containing compound.

The encapsulation layer TFE is disposed on the element layer DP_ED. The encapsulation layer TFE includes at least an inorganic layer or an organic layer. In an embodiment of the present disclosure, the encapsulation layer TFE may include two inorganic layers and an organic layer disposed therebetween. In an embodiment of the present disclosure, the encapsulation layer may include a plurality of inorganic layers and a plurality of organic layers that are alternately stacked one above the other.

The inorganic encapsulation layers protect the light emitting element ED and the light sensing element OPD from moisture/oxygen, and the organic encapsulation layer protects the light emitting element ED and the light sensing element OPD from foreign matter such as dust particles. The inorganic encapsulation layers may include a silicon nitride layer, a silicon oxy-nitride layer, a silicon oxide layer, a titanium oxide layer, and/or an aluminum oxide layer, but are not particularly limited thereto. The organic encapsulation layer may include an acrylate-based organic layer, but is not particularly limited thereto.

The display device 1000 (e.g., refer to FIG. 1) may further include the sensor layer 200 and an anti-reflection layer 300. The sensor layer 200 may be disposed on the display layer 100. The sensor layer 200 may sense an external input. The external input may be a user input. The user input may include various types of external inputs such as a part of the user's body, light, heat, a pen, or pressure. The sensor layer 200 may be referred to as a sensor, an input sensing layer, or an input sensing panel. The sensor layer 200 may include a sensor base layer 201, a first sensor conductive layer 202 (e.g., refer to FIG. 9), a sensor insulating layer 203, a second sensor conductive layer 204, and a sensor cover layer 205.

The sensor base layer 201 may be directly disposed on the display layer 100. The sensor base layer 201 may be an inorganic layer including at least one of silicon nitride, silicon oxy-nitride, or silicon oxide. In one embodiment, the sensor base layer 201 may be an organic layer including an epoxy resin, an acrylic resin, or an imide-based resin. The sensor base layer 201 may have a single-layer structure, or may have a multi-layer structure stacked in the third direction DR3.

Each of the first sensor conductive layer 202 and the second sensor conductive layer 204 may have a single-layer structure or may have a multi-layer structure stacked in the third direction DR3. A conductive layer having a single-layer structure may include a metal layer or a transparent conductive layer. The metal layer may include molybdenum, silver, titanium, copper, aluminum, or an alloy thereof. The transparent conductive layer may include transparent conductive oxide such as, but not limited to, indium tin oxide, indium zinc oxide, zinc oxide, or indium zinc tin oxide. In addition, the transparent conductive layer may include a conductive polymer such as PEDOT, a metal nano wire, or graphene. A conductive layer having a multi-layer structure may include metal layers. The meal layers may have, for example, a three-layer structure of titanium/aluminum/titanium. The conductive layer having the multi-layer structure may include at least one metal layer and at least one transparent conductive layer.

The sensor insulating layer 203 may be disposed between the first sensor conductive layer 202 and the second sensor conductive layer 204. The sensor insulating layer 203 may include an inorganic film. The inorganic film may include at least one of aluminum oxide, titanium oxide, silicon oxide, silicon nitride, silicon oxy-nitride, zirconium oxide, and/or hafnium oxide.

In one embodiment, the sensor insulating layer 203 may include an organic film. The organic film may include at least one of an acrylate-based resin, a methacrylate-based resin, a polyisoprene-based resin, a vinyl-based resin, an epoxy-based resin, a urethane-based resin, a celluose-based resin, a siloxane-based resin, a polyimide-based resin, a polyamide-based resin, or a perylene-based resin.

The sensor cover layer 205 may be disposed on the sensor insulating layer 203 and may cover the second sensor conductive layer 204. The second sensor conductive layer 204 may include a conductive pattern. The sensor cover layer 205 may cover the conductive pattern and may reduce or eliminate a probability that the conductive pattern will be damaged in a subsequent process. The sensor cover layer 205 may include an inorganic material. For example, the sensor cover layer 205 may include silicon nitride, but is not particularly limited thereto. In an embodiment of the present disclosure, the sensor cover layer 205 may be omitted.

The anti-reflection layer 300 may be disposed on the sensor layer 200. The anti-reflection layer 300 may include a dividing layer 310, a plurality of color filters 320, and a planarization layer 330. The dividing layer 310 may be disposed to overlap the conductive pattern of the second sensor conductive layer 204. The sensor cover layer 205 may be disposed between the dividing layer 310 and the second sensor conductive layer 204. The dividing layer 310 may prevent reflection of external light by the second sensor conductive layer 204. A material constituting the dividing layer 310 is not particularly limited as long as it is capable of absorbing light. The dividing layer 310 may be a black layer. In an embodiment, the dividing layer 310 may include a black coloring agent. The black coloring agent may include a black dye or a black pigment. The black coloring agent may include carbon black, metal such as chromium, or oxide thereof.

The dividing layer 310 may have a plurality of dividing openings defined therein. The plurality of dividing openings may overlap the emissive layer EL and the photoelectric conversion layer RL. The color filters 320 may be disposed to correspond to the plurality of dividing openings. The color filters 320 may transmit light provided from the emissive layers EL overlapping the color filters 320. In one embodiment, light may be transmitted through the color filters 320 and may be provided to the photoelectric conversion layer RL.

The emissive layer EL may be a green light emitting layer. Accordingly, one color filter 320 may be commonly provided for the emissive layer EL and the photoelectric conversion layer RL. However, the present disclosure is not particularly limited thereto. For example, a color filter other than a green color filter may be disposed over the photoelectric conversion layer RL. In one embodiment, the color filter 320 may not be disposed over the photoelectric conversion layer RL.

The planarization layer 330 may cover the dividing layer 310 and the color filters 320. The planarization layer 330 may include an organic material and may provide a flat surface on an upper surface of the planarization layer 330. In an embodiment, the planarization layer 330 may be omitted.

In an embodiment of the present disclosure, the anti-reflection layer 300 may include a reflection control layer instead of the color filters 320. For example, the color filters 320 may be omitted in FIG. 6, and the reflection control layer may be added at places where the color filters 320 are omitted. The reflection control layer may selectively absorb light in a partial band of light reflected inside the display panel and/or the display device or light in a partial band of light incident from outside the display panel and/or the display device.

For example, the reflection control layer may absorb light in a first wavelength region of 490 nm to 505 nm and a second wavelength region of 585 nm to 600 nm. Thus, the light transmittance in the first wavelength region and the second wavelength region may be about 40% or less. In one embodiment, the reflection control layer may absorb light outside the wavelength range of red light, green light, or blue light emitted from the emissive layer EL. Since the reflection control layer absorbs light outside the wavelength range of the red light, the green light, or the blue light emitted from the emissive layer EL as described above, a decrease in the luminance of the display panel and/or the display device may be reduced or prevented. In addition, deterioration in the light emission efficiency of the display panel and/or the display device may be reduced or prevented and as a result visibility may be improved.

The reflection control layer may be implemented with an organic layer including a dye, a pigment, or a combination thereof. The reflection control layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, or a combination thereof.

In an embodiment, the reflection control layer may have a predetermined transmittance, e.g., about 64% to about 72%. The transmittance of the reflection control layer may be adjusted depending on the content of the pigment and/or dye included in the reflection control layer.

Figure 7:
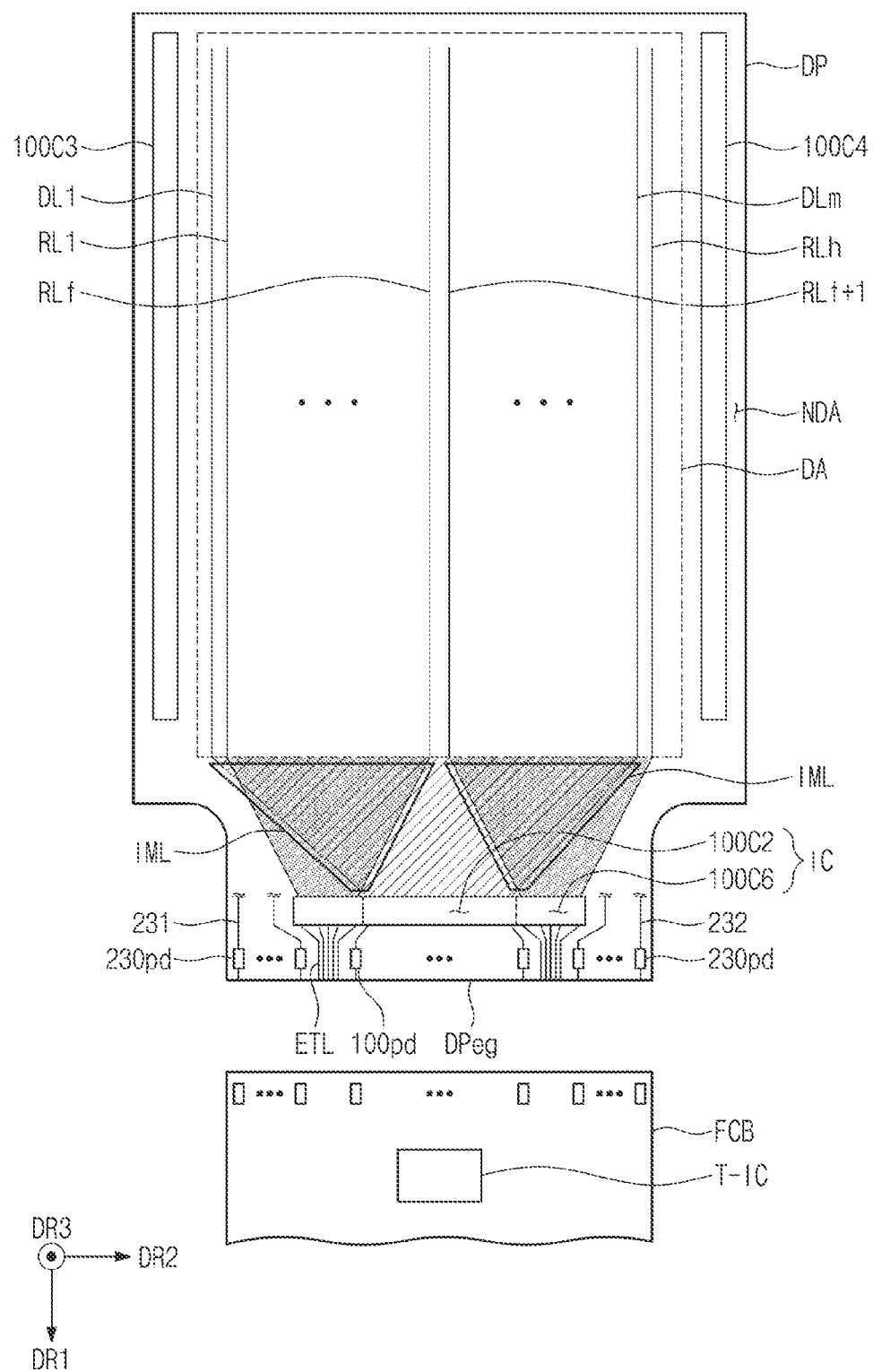
FIG. 7 is a plan view illustrating a display panel according to an embodiment of the present disclosure.

FIG. 7 is a plan view illustrating the display panel DP according to an embodiment of the present disclosure which includes a fan-out region described in greater detail below.

Referring to FIGS. 3 and 7, the data lines DL1 to DLm and the readout lines RL1 to RLh may be disposed in the active region DA and the peripheral region NDA. The data lines DL1 to DLm may be electrically connected with the plurality of pixels PX in the active region DA and may extend to the peripheral region NDA. The readout lines RL1 to RLh may be electrically connected with the plurality of sensors FX in the active region DA and may extend to the peripheral region NDA.

In an embodiment of the present disclosure, the data lines DL1 to DLm and the readout lines RL1 to RLh may extend in a same direction (DR1) in the active region DA and may extend from the active region DA toward the peripheral region NDA adjacent thereto in the first direction DR1. Accordingly, a driver for driving the sensors FX and a driver for driving the pixels PX may be disposed in positions spaced apart from the active region DA in one direction.

In this case, when compared to those in a comparative example in which the data lines DL1 to DLm and the readout lines RL1 to RLh extend in different directions with the active region DA therebetween, the area of a fan-out region and the area of the peripheral region NDA may be decreased. In addition, since only a portion of the peripheral region NDA located at a lower end based on the active region DA is angled or bent, interference between other sensors (e.g., a position sensor, a vibration sensor, and the like) disposed under the display panel DP and the bent portion of the display panel DP may be reduced. For example, when the data lines DL1 to DLm and the readout lines RL1 to RLh extend toward the peripheral region NDA located in the same direction based on the active region DA, a more advantageous structure for commercialization of the display panel DP including the sensors FX may be achieved.

At least some of the data lines DL1 to DLm and at least some of the readout lines RL1 to RLh may overlap each other in the peripheral region NDA. The data lines DL1 to DLm and the readout lines RL1 to RLh may be disposed on different layers. For example, the data lines DL1 to DLm may be disposed on the same layer as the third electrode G1 of the first transistor T1, the upper electrode UE, or the third electrode G3 of the third transistor T3 illustrated in FIG. 6. The readout lines RL1 to RLh may be disposed on the same layer as the second connecting electrode CNE20 illustrated in FIG. 6.

According to an embodiment of the present disclosure, the display panel DP may further include a conductive layer IML disposed in the fan-out region of the peripheral region NDA. The conductive layer IML is disposed between the data lines DL1 to DLm and the readout lines RL1 to RLh. In one embodiment, the conductive layer IML may be disposed on the same layer as the first connecting electrode CNE10 illustrated in FIG. 6, but may be disposed on a different layer in another embodiment. In FIG. 7, the conductive layer IML is shaded for emphasis.

A constant predetermined voltage or a ground voltage may be applied to the conductive layer IML. For example, the first drive voltage ELVDD, the second drive voltage ELVSS, the first initialization voltage VINT1 or the second initialization voltage VINT2 (e.g., refer to FIG. 5) may be provided to the conductive layer IML. However, the present disclosure is not particularly limited thereto. Accordingly, interference between signals provided to the data lines DL1 to DLm and signals provided to the readout lines RL1 to RLh may be shielded by the conductive layer IML. The conductive layer IML may be referred to as a metal shielding layer, a metal layer, a pattern layer, a metal pattern, a shielding pattern, or the like.

Figure 8:
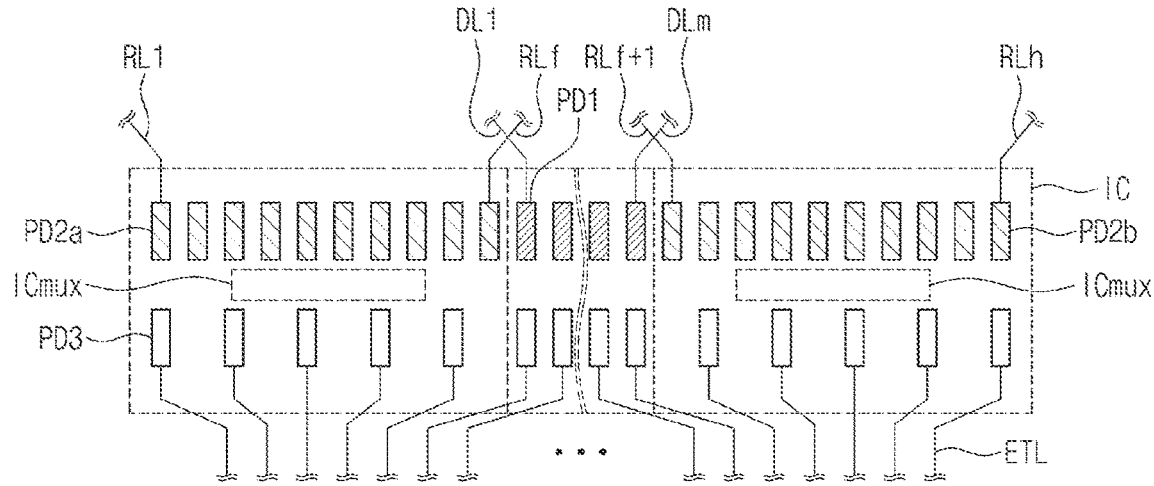
FIG. 8 is an enlarged plan view illustrating a portion of the display panel according to an embodiment of the present disclosure.
Figure 8:

FIG. 8 is an enlarged plan view illustrating a portion of the display panel DP (e.g., refer to FIG. 7) including one or more pad areas according to an embodiment of the present disclosure.

Referring to FIGS. 7 and 8, the display panel DP may further include a plurality of first pads PD1 disposed in the peripheral region NDA and a plurality of second pads PD2 disposed in the peripheral regions NDA. A driver chip IC may be mounted on the display panel DP and may be connected to the first pads PD1 and the second pads PD2. The driver chip IC may be configured to drive the plurality of pixels PX and the plurality of sensors FX (e.g., refer to FIG. 3). For example, the driver chip IC may include the data driver 100C2 and the sensor controller 100C6 (e.g., refer to FIG. 3).

The first pads PD1 may be electrically connected with the data lines DL1 to DLm in a one-to-one manner. The second pads PD2 may be electrically connected with the readout lines RL1 to RLh in a one-to-one manner. Thus, the number of first pads PD1 may be equal to the number of data lines DL1 to DLm, and the number of second pads PD2 may be equal to the number of readout lines RL1 to RLh.

In an embodiment of the present disclosure, second pads PD2*a* (which are connected to some readout lines RL1 to RL*f* among the readout lines RL1 to RLh) and second pads PD2*b* (which are connected to the other readout lines RL*f*+1 to RLh among the readout lines RL1 to RLh) may be spaced apart from each other, with the first pads PD1 disposed therebetween. Thus, in this embodiment, the second pads PD2 may not be disposed between the first pads PD1. In this case, signal interference between the first pads PD1 and the second pads PD2 may be reduced or minimized. However, this is illustrative, and the present disclosure is not particularly limited thereto. For example, in an embodiment of the present disclosure, the second pads PD2a, the second pads PD2b, and the first pads PD1 may be sequentially arranged in the second direction DR2.

The display panel DP may further include a plurality of third pads PD3 disposed in the peripheral region NDA. The third pads PD3 may be connected with the driver chip IC and may be electrically connected with the second pads PD2 through the driver chip IC. In an embodiment of the present disclosure, the driver chip IC may further include a chip multiplexer ICmux electrically connected between the second pads PD2 and the third pads PD3. Although FIG. 8 illustrates an example where the chip multiplexer ICmux is a 2×1 mux, the present disclosure is not limited thereto. Accordingly, the number of third pads PD3 may be less than the number of second pads PD2.

The display device 1000 (e.g., refer to FIG. 1) may further include a flexible circuit film FCB electrically coupled to the display panel DP and a touch driver chip T-IC mounted on the flexible circuit film FCB and configured to drive the sensor layer 200.

The display panel DP may further include a plurality of extension lines ETL electrically connected with the third pads PD3 in a one-to-one manner. According to an embodiment of the present disclosure, the number of readout lines RL1 to RLh may be greater than the number of extension lines ETL, since the number of third pads PD3 is less than the number of second pads PD2 due to the chip multiplexer ICmux and the number of extension lines ETL is equal to the number of third pads PD3.

The display panel DP may include touch pads 230pd electrically connected with first trace lines 231 and second trace lines 232. The extension lines ETL may be aligned with the touch pads 230pd in the second direction DR2. The extension lines ETL may be electrically connected with a sensor test circuit that is cut and removed. For example, the sensor test circuit may be cut and removed after a determination is made as to whether the sensor FX is abnormal using the test circuit. For example, the extension lines ETL may extend to an edge DPeg of the display panel DP. The edge DPeg of the display panel DP that extends in the second direction DR2 may correspond to a cutting line along which a portion of a preliminary display panel used for a test is cut.

According to an embodiment of the present disclosure, the gap between the extension lines ETL may be wide since the number of extension lines ETL is less than the number of readout lines RL1 to RLh. Accordingly, the possibility of a short circuit occurring and corrosion caused by a cutting part, that may otherwise exist due to narrow spacing between the extension lines ETL, may be reduced.

In addition, because the number of extension lines ETL is decreased, the size of a gap between the touch pads 230pd and display pads 100pd may be reduced. Accordingly, because the gap is reduced, the possibility of cracks forming in the display panel DP or the circuit film FCB may be reduced when the flexible circuit film FCB is pressed (and connected) to the touch pads 230pd and the display pads 100pd. Thus, the manufacturing yield and product reliability of the display device 1000 (e.g., refer to FIG. 1) may be improved.

Figure 9:
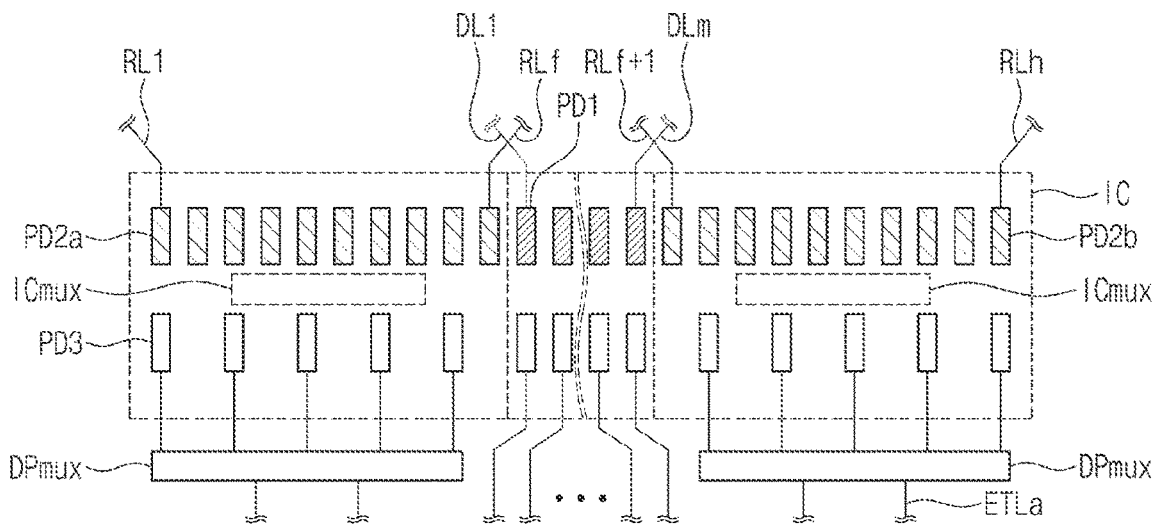
FIG. 9 is an enlarged plan view illustrating a portion of the display panel according to an embodiment of the present disclosure.
Figure 9:

FIG. 9 is an enlarged plan view illustrating a portion of the display panel DP according to an embodiment of the present disclosure. In describing FIG. 9, components identical to the components described with reference to FIG. 8 will be assigned with identical reference numerals, and descriptions thereabout will be omitted.

Referring to FIGS. 7 and 9, the display panel DP may further include a plurality of extension lines ETLa electrically connected with the third pads PD3. The number of extension lines ETLa may be less than or equal to the number of third pads PD3. In an embodiment of the present disclosure, the display panel DP may further include a multiplexer DPmux disposed in the peripheral region NDA and connected between the third pads PD3 and the extension lines ETLa. Accordingly, the number of extension lines ETLa may be less than the number of third pads PD3 in one embodiment.

According to an embodiment of the present disclosure, by using the chip multiplexer ICmux, the number of third pads PD3 may be less than the number of second pads PD2. Also, by using the multiplexer DPmux, the number of extension lines ETLa may be less than the number of third pads PD3. Accordingly, the number of readout lines RL1 to RLh may be greater than the number of extension lines ETLa. As a result, the gap between the extension lines ETLa may be wide. Thus, the possibility of a short circuit occurring and corrosion caused by a cutting part, which may otherwise occur due to narrow spacing between the extension lines ETLa, may be reduced. In addition, because the number of extension lines ETLa is decreased, the size of the gap between the touch pads 230pd and display pads 100pd may be reduced. Accordingly, because this gap is reduced, the possibility of cracks forming in the display panel DP or the circuit film FCB may be reduced when the circuit film FCB is pressed to the touch pads 230pd and the display pads 100pd.

Figure 10:
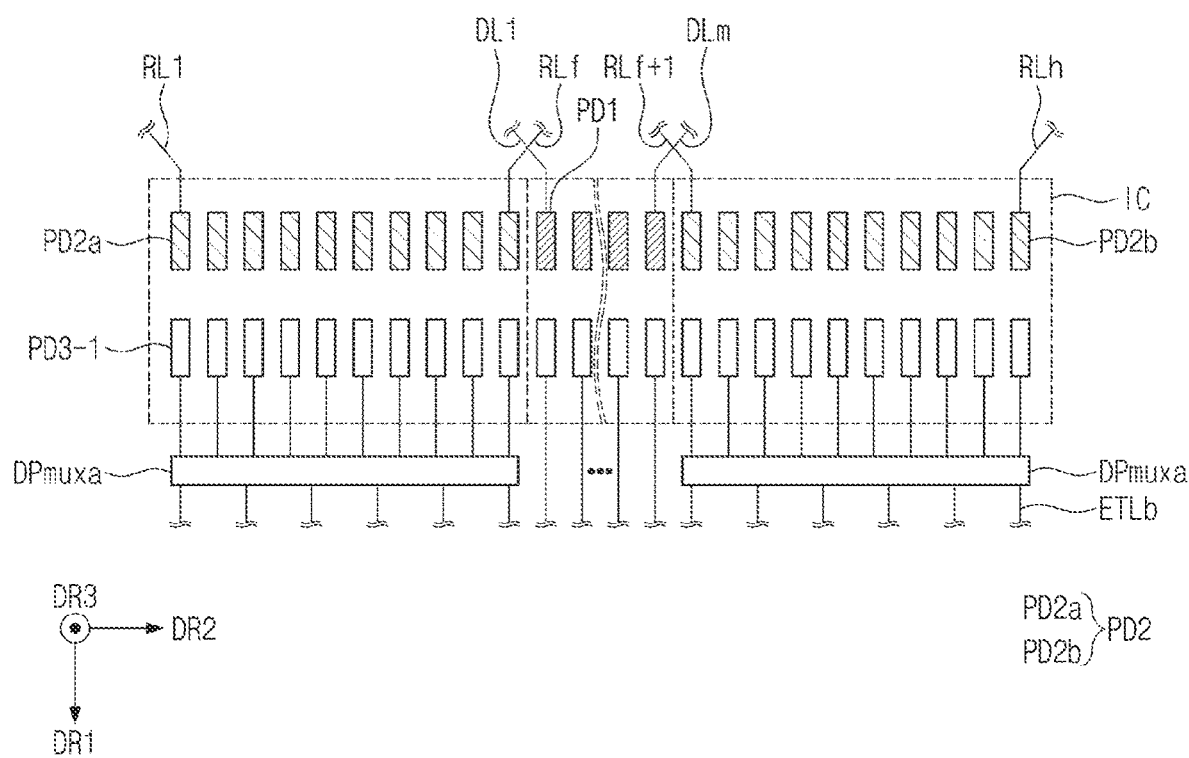
FIG. 10 is an enlarged plan view illustrating a portion of the display panel according to an embodiment of the present disclosure.

FIG. 10 is an enlarged plan view illustrating a portion of the display panel DP according to an embodiment of the present disclosure. In describing FIG. 10, components identical to the components described with reference to FIG. 8 will be assigned with identical reference numerals, and descriptions thereabout will be omitted.

Referring to FIGS. 7 and 10, the display panel DP may further include a plurality of third pads PD3-1 disposed in the peripheral region NDA. The third pads PD3-1 may be connected with the driver chip IC and may be electrically connected with the second pads PD2 through the driver chip IC. In an embodiment of the present disclosure, the third pads PD3-1 may correspond to the second pads PD2 in a one-to-one manner. Accordingly, the number of third pads PD3-1 may be equal to the number of second pads PD2.

In an embodiment of the present disclosure, the display panel DP may further include a multiplexer DPmuxa disposed in the peripheral region NDA and connected between the third pads PD3-1 and extension lines ETLb. Accordingly, the number of extension lines ETLb may be less than the number of third pads PD3-1.

Figure 11:
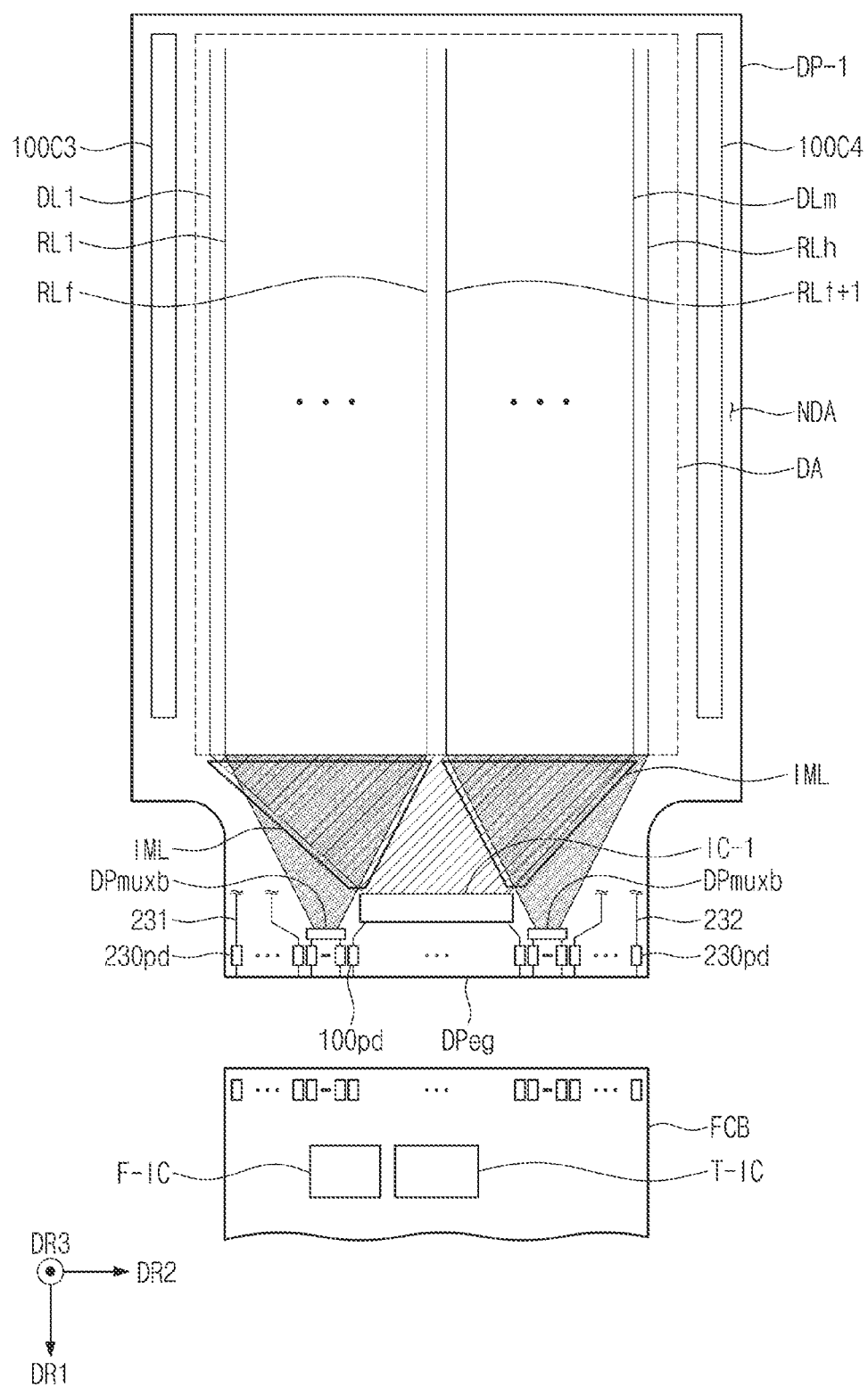
FIG. 11 is a plan view illustrating a display panel according to an embodiment of the present disclosure.
Figure 12:
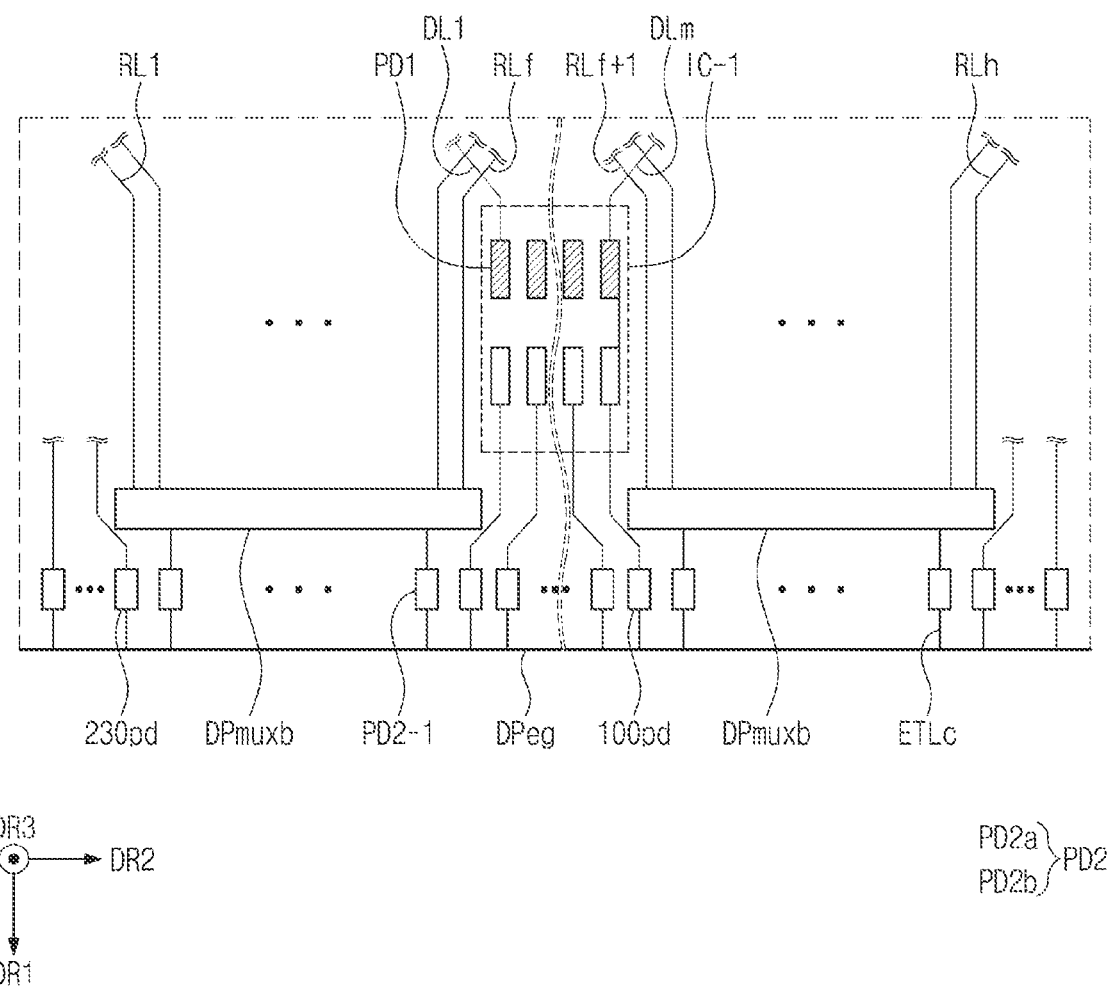
FIG. 12 is an enlarged plan view illustrating a portion of the display panel according to an embodiment of the present disclosure.

FIG. 11 is a plan view illustrating a display panel DP-1 according to an embodiment of the present disclosure. FIG. 12 is an enlarged plan view illustrating a portion of the display panel DP-1 according to an embodiment of the present disclosure. In describing FIGS. 11 and 12, components identical to the components described with reference to FIG. 7 will be assigned with identical reference numerals, and descriptions thereabout will be omitted.

Referring to FIGS. 3, 11, and 12, the display device 1000 (e.g., refer to FIG. 1) may further include a flexible circuit film FCB electrically coupled to the display panel DP-1, a touch driver chip T-IC mounted on the flexible circuit film FCB and configured to drive the sensor layer 200 (e.g., refer to FIG. 4), and a sensor driver chip F-IC mounted on the flexible circuit film FCB and configured to drive the sensors FX. The sensor driver chip F-IC may include the sensor controller 100C6.

The data lines DL1 to DLm and the readout lines RL1 to RLh may be disposed in the active region DA and the peripheral region NDA. The data lines DL1 to DLm may be electrically connected with the plurality of pixels PX in the active region DA and may extend to the peripheral region NDA. The readout lines RL1 to RLh may be electrically connected with the plurality of sensors FX in the active region DA and may extend to the peripheral region NDA.

The display panel DP-1 may further include a plurality of first pads PD1 disposed in the peripheral region NDA and pads PD2-1 disposed in the peripheral regions NDA. The pads PD2-1 may be electrically connected with the readout lines RL1 to RLh. The number of pads PD2-1 may be less than or equal to the number of readout lines RL1 to RLh.

In an embodiment of the present disclosure, the display panel DP-1 may further include a multiplexer DPmuxb disposed in the peripheral region NDA and connected between the pads PD2-1 and the readout lines RL1 to RLh. Accordingly, the number of pads PD2-1 may be less than the number of readout lines RL1 to RLh.

According to an embodiment of the present disclosure, the size of the gap between the pads PD2-1 may be made to be wide since the number of pads PD2-1 is less than the number of readout lines RL1 to RLh. Accordingly, the possibility of a short circuit occurring and corrosion caused by a cutting part, which may otherwise occur due to narrow spacing between the pads PD2-1, may be reduced.

In addition, because the size of the gap between the pads PD201 is wide, the pads PD2-1 may be aligned in the second direction DR2 between the touch pads 230pd and the display pads 100pd. Accordingly, the sensor driver chip F-IC for driving the sensors FX may be disposed on the flexible circuit film FCB.

The display panel DP-1 may further include a plurality of extension lines ETLc electrically connected with the pads PD2-1. In one embodiment, the number of extension lines ETLc may be less than or equal to the number of readout lines RL1 to RLh. Accordingly, the size of the gap between the extension lines ETLc may be wide. Thus, the possibility of a short circuit occurring and corrosion caused by a cutting part, which may otherwise occur due to narrow spacing between the extension lines ETLc, may be reduced.

Figure 13:
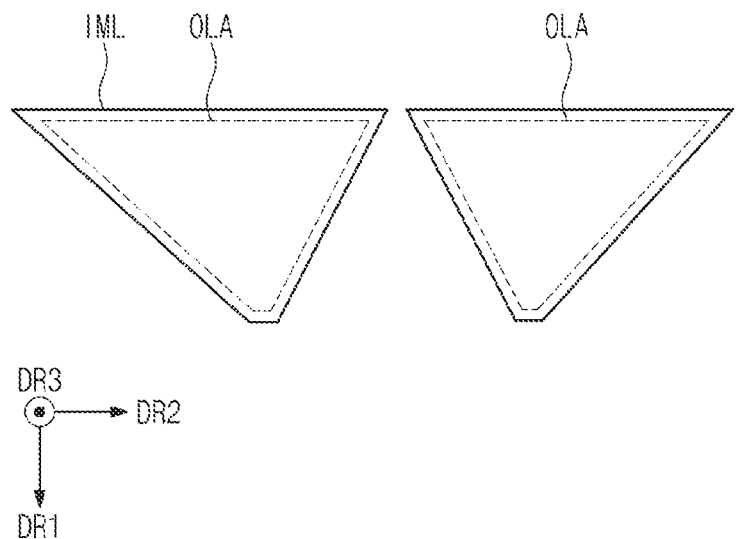
FIG. 13 is a plan view illustrating a conductive layer according to an embodiment of the present disclosure.

FIG. 13 is a plan view illustrating the conductive layer IML according to an embodiment of the present disclosure. As shown, the conductive layer IML has a fan-out shape that corresponds to the data lines DL1 to DLm and the read-out lines RL1 to RLh.

Referring to FIGS. 7 and 13, an overlapping region OLA is illustrated in which the data lines DL1 to DLm and the readout lines RL1 to RLh overlap each other. In an embodiment of the present disclosure, the conductive layer IML may cover the overlapping region OLA. Accordingly, interference between signals provided to the data lines DL1 to DLm and signals provided to the readout lines RL1 to RLh may be shielded by the conductive layer IML. Thus, noise that is likely to occur in the signals transmitted to the data lines DL1-DLm and the signals transmitted to the readout lines RL1-RLh may be reduced or eliminated.

In an embodiment of the present disclosure, the conductive layer IML may have a shape corresponding to the overlapping region OLA. The conductive layer IML may be disposed on the same layer as the first connecting electrode CNE10 illustrated in FIG. 6. Accordingly, insulating layers disposed under the conductive layer IML, for example, the first to fifth insulating layers 10, 20, 30, 40, and 50 (e.g., refer to FIG. 6), may all be inorganic layers. A larger amount of gas may be released from an organic layer than from an inorganic layer. Accordingly, an opening for outgassing may not be formed in the conductive layer IML. Thus, the conductive layer IML may have a plate shape in which an opening is not included. As a result, signal interference between the data lines DL1 to DLm and the readout lines RL1 to RLh may be more easily shielded.

Figure 14:
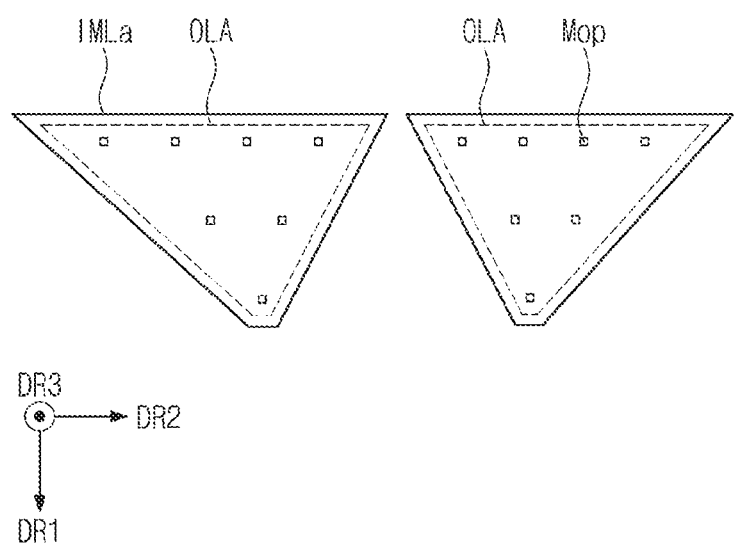
FIG. 14 is a plan view illustrating a conductive layer according to an embodiment of the present disclosure.

FIG. 14 is a plan view illustrating a conductive layer IMLa according to an embodiment of the present disclosure. In this embodiment, the conductive layer IML also has a shape which corresponds to the fan-out region.

Referring to FIGS. 7 and 14, the conductive layer IMLa may cover an overlapping region OLA. The conductive layer IMLa may have a plurality of openings Mop included therein. Each of the plurality of openings Mop may have a quadrangular shape when viewed from above the plane. However, this is illustrative, and the plurality of openings Mop may have various other shapes, such as a quadrangular shape, a polygonal shape, an irregular shape, and the like.

The plurality of openings Mop may not overlap the data lines DL1 to DLm, may not overlap the readout lines RL1 to RLh, or may not overlap both the data lines DL1 to DLm and the readout lines RL1 to RLh. Accordingly, the plurality of openings Mop may not be included in portions that the data lines DL1 to DLm and the readout lines RL1 to RLh substantially overlap, and the portions may be covered by the conductive layer IMLa.

Figure 15:
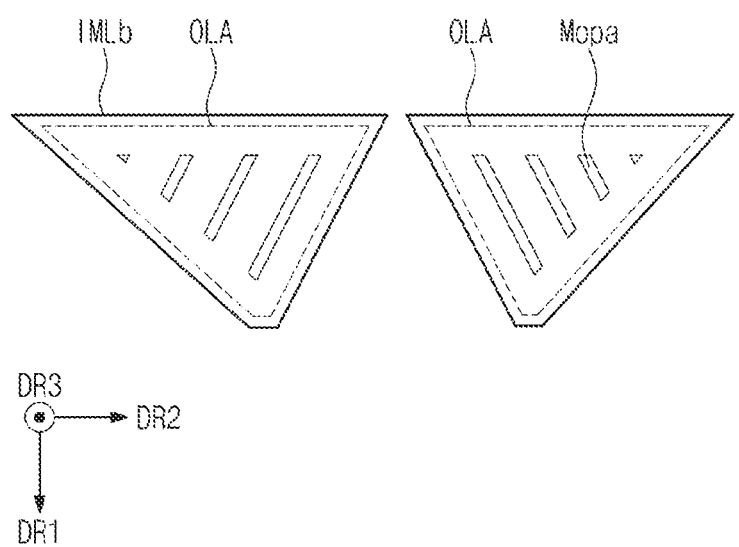
FIG. 15 is a plan view illustrating a conductive layer according to an embodiment of the present disclosure.

FIG. 15 is a plan view illustrating a conductive layer IMLb according to an embodiment of the present disclosure. Once again, the conductive layer IMLb has a shape which corresponds to the fan-out region.

Referring to FIGS. 7 and 15, the conductive layer IMLb may cover an overlapping region OLA. The conductive layer IMLb may have a plurality of openings Mopa included therein. When viewed from above the plane, the plurality of openings Mopa may not overlap the data lines DL1 to DLm, or may not overlap the readout lines RL1 to RLh. Accordingly, the plurality of openings Mopa may not be included in portions that the data lines DL1 to DLm and the readout lines RL1 to RLh substantially overlap, and the portions may be covered by the conductive layer IMLb.

In FIGS. 13, 14, and 15, the conductive layers IML, IMLa, and IMLb are illustrated for shielding signal interference between the data lines DL1 to DLm and the readout lines RL1 to RLh. However, the present disclosure is not limited thereto. For example, the conductive layers IML, IMLa, and IMLb may be modified and provided in various shapes as long as the conductive layers IML, IMLa, and IMLb are capable of shielding the signal interference between the data lines DL1 to DLm and the readout lines RL1 to RLh.

In accordance with one or more of the aforementioned embodiments, data lines and readout lines of the display panel may extend from the active region toward the peripheral region adjacent thereto in the first direction. Accordingly, the driver for driving the sensors and the driver for driving the pixels may be disposed in positions spaced apart from the active region in one direction. As a result, the area of the fan-out region and the area of the peripheral region may be reduced. Furthermore, since only a portion of the peripheral region located at the lower end based on the active region is bent, interference between other sensors (e.g., a position sensor, a vibration sensor, and the like)

disposed under the display panel and the bent portion of the display panel may be reduced.

The display panel may further include the conductive layer disposed in the peripheral region and disposed between the data lines and the readout lines. Interference between signals provided to the data lines and signals provided to the readout lines may be shielded by the conductive layer. Accordingly, noise that is likely to occur in the signals transmitted to the data lines and the signals transmitted to the readout lines may be reduced or eliminated.

The readout lines may be electrically connected with the extension lines, and the extension lines may extend toward the edge of the display panel. The number of extension lines may be less than the number of readout lines. As a result, the size of a gap between the extension lines may be wide. Thus, the possibility of a short circuit occurring and corrosion caused at the edge of the display panel, which otherwise may occur due to narrow spacing between the extension lines, may be reduced. In addition, as the number of extension lines is decreased, the size of the gap between the touch pads and the display pads may be reduced. Because the size of the gap is reduced, the possibility of cracks forming in the display panel or the circuit film may be reduced when the circuit film is pressed to the touch pads and the display pads. Thus, manufacturing yield and product reliability of the display device may be improved.

While the present disclosure has been described with reference to embodiments thereof, it will be apparent to those of ordinary skill in the art that various changes and modifications may be made thereto without departing from the spirit and scope of the present disclosure as set forth in the following claims. The embodiments may be combined to form additional embodiments.

What is claimed is:

1. A display device comprising:
a display panel including an active region and a peripheral region adjacent to the active region; and
a driver chip mounted on the display panel,
wherein the display panel includes:
a base layer;
a plurality of pixels disposed in the active region;
a plurality of data lines electrically connected with the plurality of pixels and configured to extend to the driver chip;
a plurality of sensors disposed in the active region;
a plurality of readout lines electrically connected with the plurality of sensors and configured to extend from the active region to the driver chip; and
a conductive layer disposed in the peripheral region and between one or more of the plurality of data lines and one or more of the plurality of readout lines,
wherein each of the plurality of pixels includes a pixel drive circuit comprising a transistor that includes a gate electrode disposed on a first layer above the base layer, a first connection electrode disposed on a second layer above the first layer and electrically connected to the pixel drive circuit, a second connection electrode disposed on a third layer above the second layer and connected to the first connection electrode, and a light-emitting element disposed on a fourth layer above the third layer and connected to the second connection electrode,
wherein the plurality of data lines are disposed on the first layer, which is same as the gate electrode, the plurality of readout lines are disposed on the third layer, which is same as the second connection electrode, and the conductive layer is disposed on the second layer, which is same as the first connection electrode, and
wherein the first layer, the second layer, and the third layer are disposed between the base layer and the fourth layer.

2. The display device of claim 1, wherein a ground voltage is applied to the conductive layer.

3. The display device of claim 1, wherein the display panel further includes:
a plurality of first pads disposed in the peripheral region, and electrically connected with the plurality of data lines in a one-to-one manner; and
a plurality of second pads disposed in the peripheral region and electrically connected with the plurality of readout lines in a one-to-one manner.

4. The display device of claim 3, wherein:
the driver chip is configured to drive the plurality of pixels and the plurality of sensors, the driver chip being electrically connected to the plurality of first pads and the plurality of second pads,
the driver chip includes a data driver and a sensor controller, and
the data driver is disposed between a first portion of the sensor controller and a second portion of the sensor controller.

5. The display device of claim 4, wherein:
the display panel further includes a plurality of third pads electrically connected with the plurality of second pads,
the driver chip includes a chip multiplexer electrically connected between the plurality of second pads and the plurality of third pads, and
a number of third pads is less than a number of second pads.

6. The display device of claim 5, wherein the display panel further includes a plurality of extension lines electrically connected with the plurality of third pads in a one-to-one manner.

7. The display device of claim 5, wherein the display panel further includes:
a multiplexer electrically connected with the plurality of third pads, and
a plurality of extension lines electrically connected with the plurality of third pads through the multiplexer, wherein a number of extension lines is less than the number of third pads.

8. The display device of claim 4, wherein the display panel further includes:
a plurality of third pads electrically connected with the plurality of second pads in a one-to-one manner and a plurality of extension lines electrically connected with the plurality of third pads, and
wherein the driver chip is connected with the plurality of third pads, and a number of extension lines is less than or equal to a number of third pads.

9. The display device of claim 8, wherein the display panel further includes:
a multiplexer electrically connected between the plurality of third pads and the plurality of extension lines, wherein the number of extension lines is less than the number of third pads.

10. The display device of claim 1, wherein the display panel further includes:
a plurality of extension lines electrically connected with the plurality of readout lines, wherein the plurality of extension lines extend toward an edge of the display panel.

11. The display device of claim 10, wherein a number of the plurality of extension lines is less than a number of the plurality of readout lines.

12. The display device of claim 10, wherein the display panel further includes:
a multiplexer disposed in the peripheral region and electrically connected between the plurality of readout lines and the plurality of extension lines.

13. The display device of claim 1, wherein the display panel further includes:
a plurality of sensing electrodes disposed to overlap the active region;
a plurality of trace lines electrically connected with the plurality of sensing electrodes;
a plurality of touch pads electrically connected with the plurality of trace lines; and
a plurality of extension lines aligned with the plurality of touch pads and electrically connected with the plurality of readout lines, wherein a number of extension lines is less than a number of readout lines.

14. The display device of claim 1, wherein at least some of the plurality of data lines and at least some of the plurality of readout lines overlap each other in the peripheral region.

15. A display device comprising:
a display panel including an active region and a peripheral region adjacent to the active region; and
a circuit film coupled to the display panel,
wherein the display panel includes:
a base layer;
a plurality of pixels disposed in the active region;
a plurality of data lines electrically connected with the plurality of pixels and configured to extend to the peripheral region and connected to a plurality of first pads in the peripheral region;
a plurality of sensors disposed in the active region;
a plurality of readout lines electrically connected with the plurality of sensors and configured to extend from the active region to the peripheral region, the plurality of readout lines connected to a plurality of second pads in the peripheral region in a one-to-one manner;
a conductive layer disposed in the peripheral region and between one or more of the plurality of data lines and one or more of the plurality of readout lines, and
a plurality of extension lines electrically connected with the plurality of readout lines through a multiplexer, wherein a number of the plurality of extension lines is less than a number of the plurality of readout lines,
wherein each of the plurality of pixels includes a pixel drive circuit comprising a transistor that includes a gate electrode disposed on a first layer above the base layer, a first connection electrode disposed on a second layer above the first layer and electrically connected to the pixel drive circuit, a second connection electrode disposed on a third layer above the second layer and connected to the first connection electrode, and a light-emitting element disposed on a fourth layer above the third layer and connected to the second connection electrode,
wherein the plurality of data lines are disposed on the first layer, which is same as the gate electrode, the plurality of readout lines are disposed on the third layer, which is same as the second connection electrode, and the conductive layer is disposed on the second layer, which is same as the first connection electrode, and
wherein the first layer, the second layer, and the third layer are disposed between the base layer and the fourth layer.

16. The display device of claim 15, wherein:
at least some of the plurality of data lines and at least some of the plurality of readout lines overlap each other in the peripheral region.

17. The display device of claim 15, further comprising:
a driver chip mounted on the display panel and configured to drive the plurality of pixels and the plurality of sensors and including a data driver and a sensor controller,
wherein the data driver is disposed between a first portion of the sensor controller and a second portion of the sensor controller.

18. An electronic device comprising a display device comprising:
a base layer;
a plurality of pixels disposed in an active region, each pixel comprising a pixel drive circuit comprising a transistor that includes a gate electrode disposed on a first layer above the base layer, a first connection electrode disposed on a second layer above the first layer and electrically connected to the pixel drive circuit, a second connection electrode disposed on a third layer above the second layer and connected to the first connection electrode, and a light-emitting element disposed on a fourth layer above the third layer and connected to the second connection electrode;
a plurality of sensors disposed in the active region, each sensor comprising a light sensing element and a sensor drive circuit;
an encapsulation layer disposed on the plurality of pixels and the plurality of sensors;
a plurality of data lines coupled to the plurality of pixels;
a plurality of readout lines coupled to the plurality of sensors;
a fan-out region including a shielding layer disposed between the plurality of data lines and the plurality of readout lines in a peripheral region, wherein the plurality of data lines and the plurality of readout lines extend in a same direction in the active region; and
a driver chip mounted on the peripheral region and electrically connected to the plurality of data lines,
wherein the plurality of data lines are disposed on the first layer, which is same as the gate electrode, the plurality of readout lines are disposed on the third layer, which is same as the second connection electrode, and the shielding layer is disposed on the second layer, which is same as the first connection electrode, and
wherein the first layer, the second layer, and the third layer are disposed between the base layer and the fourth layer.

19. The electronic device of claim 18, wherein the shielding layer is coupled to a predetermined voltage.

20. The electronic device of claim 18, wherein the plurality of data lines and the plurality of readout lines are bent in the fan-out region.

* * * * *